United States Patent
Zhao et al.

(10) Patent No.: US 10,291,935 B2
(45) Date of Patent: May 14, 2019

(54) IMAGE PROCESSING METHOD AND APPARATUS

(71) Applicant: Huawei Technologies Co., Ltd., Shenzhen (CN)

(72) Inventors: Yin Zhao, Hangzhou (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 15/645,052

(22) Filed: Jul. 10, 2017

(65) Prior Publication Data

US 2017/0310998 A1    Oct. 26, 2017

Related U.S. Application Data

(63) Continuation of application No. PCT/CN2016/070228, filed on Jan. 6, 2016.

(30) Foreign Application Priority Data

Jan. 9, 2015    (CN) .......................... 2015 1 0012142

(51) Int. Cl.
*G06K 9/62* (2006.01)
*H04N 19/60* (2014.01)
(Continued)

(52) U.S. Cl.
CPC ........... *H04N 19/60* (2014.11); *H04N 19/136* (2014.11); *H04N 19/18* (2014.11); *H04N 19/182* (2014.11);
(Continued)

(58) Field of Classification Search
CPC ...... H04N 19/60; H04N 19/80; H04N 19/136; H04N 19/61; H04N 19/18; H04N 19/182; H04N 19/50
See application file for complete search history.

(56) References Cited

U.S. PATENT DOCUMENTS 5,396,292 A    3/1995    Murata
8,571,349 B1    10/2013    Kwatra et al.
(Continued)

FOREIGN PATENT DOCUMENTS

CN    1145564 A    3/1997
CN    101409845 A    4/2009
(Continued)

OTHER PUBLICATIONS

Machine Translation and Abstract of Chinese Publication No. CN101783954, dated Jul. 21, 2010, 8 pages.
(Continued)

*Primary Examiner* — Howard D Brown, Jr.
(74) *Attorney, Agent, or Firm* — Conley Rose, P.C.

(57) ABSTRACT

An image processing method and apparatus includes transforming a first image to obtain a first transform coefficient set; transforming a second image, or transforming a difference image between the first image and a second image, to obtain a second transform coefficient set; selecting a first group of transform coefficients from the first transform coefficient set according to magnitudes of transform coefficients in the first transform coefficient set, where magnitudes of transform coefficients in the first group of transform coefficients meet a preset threshold condition; determining an image difference between the first image and the second image according to the first group of transform coefficients and the second transform coefficient set; and processing the first image and the second image according to the image difference.

28 Claims, 3 Drawing Sheets

(51) Int. Cl.

| | | |
|---|---|---|
| *H04N 19/18* | (2014.01) | |
| *H04N 19/182* | (2014.01) | |
| *H04N 19/50* | (2014.01) | |
| *H04N 19/61* | (2014.01) | |
| *H04N 19/136* | (2014.01) | |
| *H04N 19/80* | (2014.01) | |

(52) U.S. Cl.
CPC ............ *H04N 19/50* (2014.11); *H04N 19/61* (2014.11); *H04N 19/80* (2014.11)

(56) References Cited

U.S. PATENT DOCUMENTS

| | | | | |
|---|---|---|---|---|
| 2006/0285590 | A1* | 12/2006 | Guleryuz | H04N 19/105 375/240.12 |
| 2007/0280353 | A1 | 12/2007 | Arakawa et al. | |
| 2012/0121013 | A1* | 5/2012 | Lainema | H04N 19/00 375/240.12 |
| 2013/0022099 | A1* | 1/2013 | Liu | H04N 19/46 375/240.01 |
| 2014/0044166 | A1* | 2/2014 | Xu | H04N 19/61 375/240.12 |
| 2014/0098861 | A1 | 4/2014 | Yu et al. | |
| 2014/0212044 | A1* | 7/2014 | Savvides | G06K 9/4609 382/190 |
| 2016/0381375 | A1 | 12/2016 | Cao et al. | |

FOREIGN PATENT DOCUMENTS

| | | | |
|---|---|---|---|
| CN | 101783954 | A | 7/2010 |
| CN | 103108177 | A | 5/2013 |
| CN | 103442235 | A | 12/2013 |
| CN | 103974076 | A | 8/2014 |
| CN | 104602025 | A | 5/2015 |
| EP | 1416734 | A1 | 5/2004 |
| WO | 2013131851 | A2 | 9/2013 |
| WO | 2013177779 | A1 | 12/2013 |

OTHER PUBLICATIONS

Machine Translation and Abstract of Chinese Publication No. CN1145564, dated Mar. 19, 1997, 7 pages.
Machine Translation and Abstract of Chinese Publication No. CN103108177, dated May 15, 2013, 17 pages.
Machine Translation and Abstract of Chinese Publication No. CN103442235, Dec. 11, 2013, 17 pages.
Machine Translation and Abstract of Chinese Publication No. CN104602025, May 6, 2015, 36 pages.
Zhang, R., et al., "Image Postprocessing by Non-local Kuan's filter," J. Vis. Commun. Image R., vol. 22, 2011, pp. 251-262.
Hu, J., et al., Improved DCT-Based Nonlocal Means Filter for MR Images Denoising, Computational and Mathematical Methods in Medicine, Article ID 232685, 2012, 15 pages.
Series H: Audiovisual and Multimedia Systems, Infrastructure of audiovisual services—Coding of moving video, Advanced video coding for generic audiovisual services, ITU-T, H.264, Feb. 2014, 790 pages.
"Series ID: Audiovisual and Multimedia Systems, Infrastructure of audiovisual services—coding of moving video, High efficiency video coding," ITU-T, H.265, Oct. 2014, 540 pages.
Foreign Communication From a Counterpart Application, Chinese Application No. 201510012142.4, Chinese Search Report dated May 10, 2017, 2 pages.
Foreign Communication From a Counterpart Application, Chinese Application No. 201510012142.4, Chinese Office Action dated May 18, 2017, 5 pages.
Foreign Communication From a Counterpart Application, PCT Application No. PCT/CN2016/070228, English Translation of International Search Report dated Apr. 11, 2016, 2 pages.
Foreign Communication From a Counterpart Application, PCT Application No. PCT/CN2016/070228, English Translation of Written Opinion dated Apr. 11, 2016, 6 pages.
Zhu, Y., et al., "Single Image Super-resolution Using Deformable Patches,", XP032649326, 2014 IEEE Conference on Computer Vision and Pattern Recognition, Jun. 23, 2014, pp. 2917-2924.
Foreign Communication From a Counterpart Application, European Application No. 16734909.1, Extended European Search Report dated Dec. 1, 2017, 13 pages.

\* cited by examiner

IMAGE PROCESSING METHOD AND APPARATUS

CROSS-REFERENCE TO RELATED APPLICATIONS

This application is a continuation application of International Patent Application No. PCT/CN2016/070228, filed on Jan. 6, 2016, which claims priority to Chinese Patent Application No. 201510012142.4, filed on Jan. 9, 2015. The disclosures of the aforementioned applications are hereby incorporated herein by reference in their entireties.

TECHNICAL FIELD

The present disclosure relates to the image processing field, and more specifically, to an image processing method and apparatus.

BACKGROUND

Video coding, for example, video coding standards such as H.264/Advanced Video Coding (AVC), H.265/High Efficiency Video Coding (HEVC), and Audio Video Standard (AVS), usually uses a hybrid coding framework, and mainly includes processes such as prediction, transform, quantization, and entropy coding. Video decoding is a process of converting a bitstream into video images, and includes several main processes such as entropy decoding, prediction, dequantization, and inverse transform. First, entropy decoding processing is performed on the bitstream, to parse out encoding mode information and quantized transform coefficients. Then, on one hand, predicted pixels are obtained by using the encoding mode information and decoded reconstructed pixels; and on the other hand, dequantization is performed on the quantized transform coefficients, to obtain reconstructed transform coefficients, and then, inverse transform is performed on the reconstructed transform coefficients, to obtain reconstructed residual information. Subsequently, the reconstructed residual information and the predicted pixels are added to obtain reconstructed pixels, so as to restore the video images.

For lossy coding, a reconstructed pixel and an original pixel may be different, and a numerical value difference between the two is referred to as distortion. Generally, distortion is caused by quantization. A greater quantization parameter (QP) causes stronger distortion, a blurrier image, and in general, poorer pixel quality.

Coding based on a knowledge base is an extension of H.264/AVC and H.265/HEVC. A decoder side includes a knowledge base in which some images and/or image regions are stored and are referred to as patches. The images or patches in the knowledge base may come from decoded reconstructed images in a current decoding video. For example, some representative images are extracted from the decoded reconstructed images and are added to the knowledge base. Alternatively, the images or patches in the knowledge base may not come from reconstructed images of a current decoding video, for example, come from reconstructed images or patches obtained by decoding another video, and for another example, come from multiple images or patches pre-stored by a decoding system, where the pre-stored images or patches may be uncompressed original images. When a current video is decoded, pixel information in the knowledge base may be used. For example, predicted pixel information used during decoding may come from the pixel information in the knowledge base.

In the prediction process, predicted pixels of original pixels corresponding to a current coding block are generated by using reconstructed pixels of a coded region. Prediction manners mainly include two major types: intra-frame prediction (intra prediction) and inter-frame prediction (inter prediction). In a template matching technology of intra-frame coding and a decoder side motion vector derivation technology of inter-frame coding, a reconstructed image template around a current decoding prediction block needs to be used to search a reconstructed region in a current frame or search another reconstructed frame for one or more nearest neighbor images with minimum differences from a template of the current decoding block, where the nearest neighbor images are referred to matched images. For the two types of technologies, how to evaluate an image difference or a value-space distance between a template image and a candidate template image in a matching process is a key issue, and directly determines a final searching result. A conventional method for calculating an image difference between two images is, for example, a sum of squared errors (SSE), a sum of absolute difference (SAD), a mean square error (MSE), or a mean absolute difference (MAD) of two image pixel domains, and for another example, a sum of absolute transformed difference (SATD) of transform coefficient domains obtained by performing Hadamard transform on two images. Image difference calculation also plays a pivotal role in other processing such as image searching and image fusion. In a conventional image difference calculation method, signal quality improvement of a high-quality image relative to a low-quality image is falsely considered as a difference between the two images, and an image that has a relatively small difference and that is obtained by using a conventional difference calculation method such as a SSE of two image pixel domains may not be visually similar to an image being searched for. As a result, a subsequent image processing result is inaccurate.

SUMMARY

Embodiments of the present disclosure provide an image processing method and apparatus, to improve image processing accuracy.

According to a first aspect, an image processing method is provided, including transforming a first image to obtain a first transform coefficient set; transforming a second image in a same manner, or transforming a difference image between the first image and a second image in a same manner, to obtain a second transform coefficient set; selecting a first group of transform coefficients from the first transform coefficient set according to magnitudes of transform coefficients in the first transform coefficient set, where magnitudes of transform coefficients in the first group of transform coefficients meet a preset threshold condition; determining an image difference between the first image and the second image according to the first group of transform coefficients and the second transform coefficient set; and processing the first image and the second image according to the image difference.

With reference to the first aspect, in an implementation of the first aspect, when the second transform coefficient set is a transform coefficient set that is obtained by transforming the second image in the same manner, the determining an image difference between the first image and the second image according to the first group of transform coefficients and the second transform coefficient set includes selecting, from the second transform coefficient set according to a one-to-one correspondence between transform coefficients in the first transform coefficient set and in the second transform coefficient set, a second group of transform coefficients that is corresponding to the first group of transform coefficients; and determining the image difference according to the first group of transform coefficients and the second group of transform coefficients.

With reference to either of the first aspect or the foregoing implementation of the first aspect, in another implementation of the first aspect, determining the image difference according to the first group of transform coefficients and the second group of transform coefficients includes determining differences between corresponding transform coefficients in the first group of transform coefficients and in the second group of transform coefficients; and determining a sum of the differences between the corresponding transform coefficients as the image difference.

With reference to either of the first aspect or the foregoing implementation of the first aspect, in another implementation of the first aspect, both the first group of transform coefficients and the second group of transform coefficients are divided into N subgroups in a same manner; and determining the image difference according to the first group of transform coefficients and the second group of transform coefficients includes determining N target values, where an $i^{th}$ target value in the N target values is a sum of differences between corresponding transform coefficients in an $i^{th}$ subgroup of the first group of transform coefficients and in an $i^{th}$ subgroup of the second group of transform coefficients; and performing weighted summation on the N target values according to weighting coefficients of the N subgroups, to obtain the image difference.

With reference to either of the first aspect or the foregoing implementation of the first aspect, in another implementation of the first aspect, determining the image difference according to the first group of transform coefficients and the second group of transform coefficients includes determining a first target value, where the first target value is a sum of differences between corresponding transform coefficients in the first group of transform coefficients and in the second group of transform coefficients; determining a second target value, where the second target value is a sum of differences between corresponding transform coefficients in remaining transform coefficients other than the first group of transform coefficients in the first transform coefficient set and in remaining transform coefficients other than the second group of transform coefficients in the second transform coefficient set; and performing weighted summation on the first target value and the second target value according to a weighting coefficient of the first target value and a weighting coefficient of the second target value, to obtain the image difference.

With reference to any one of the first aspect or the foregoing implementations of the first aspect, in another implementation of the first aspect, when the second transform coefficient set is a transform coefficient set that is obtained by transforming the difference image between the first image and the second image in the same manner, determining an image difference between the first image and the second image according to the first group of transform coefficients and the second transform coefficient set includes selecting, from the second transform coefficient set according to a one-to-one correspondence between transform coefficients in the first transform coefficient set and in the second transform coefficient set, a second group of transform coefficients that is corresponding to the first group of transform coefficients; and determining the image difference according to the second group of transform coefficients.

With reference to either of the first aspect or the foregoing implementation of the first aspect, in another implementation of the first aspect, determining the image difference according to the second group of transform coefficients includes determining a sum of transform coefficients in the second group of transform coefficients as the image difference.

With reference to either of the first aspect or the foregoing implementation of the first aspect, in another implementation of the first aspect, the second group of transform coefficients includes N subgroups, and determining the image difference according to the second group of transform coefficients includes determining N target values, where an $i^{th}$ target value is a sum of transform coefficients in an $i^{th}$ subgroup; and performing weighted summation on the N target values according to weighting coefficients of the N target values, to obtain the image difference.

With reference to either of the first aspect or the foregoing implementation of the first aspect, in another implementation of the first aspect, determining the image difference according to the second group of transform coefficients includes determining a first target value, where the first target value is a sum of transform coefficients in the second group of transform coefficients; determining a second target value, where the second target value is a sum of remaining transform coefficients other than the second group of transform coefficients in the second transform coefficient set; and performing weighted summation on the first target value and the second target value according to a weighting coefficient of the first target value and a weighting coefficient of the second target value, to obtain the image difference.

With reference to any one of the first aspect or the foregoing implementations of the first aspect, in another implementation of the first aspect, the first image is a target image, the second image is any candidate image in K candidate images; and processing the first image and the second image according to the image difference includes determining a weighting coefficient of each candidate image according to an image difference between the target image and each candidate image; and determining a filtered image of the target image according to pixel values of the K candidate images and weighting coefficients of the K candidate images.

With reference to either of the first aspect or the foregoing implementation of the first aspect, in another implementation of the first aspect, determining a weighting coefficient of each candidate image according to an image difference between the target image and each candidate image includes determining the weighting coefficient of each candidate image according to $Wk=b1^{(-(Dk)^{a1}/h1)}$, where each of b1, a1, and h1 represents a positive real number, Dk represents an image difference between the first image and a $k^{th}$ candidate image, and Wk represents a weighting coefficient of the $k^{th}$ candidate image.

With reference to either of the first aspect or the foregoing implementation of the first aspect, in another implementation of the first aspect, determining a weighting coefficient of each candidate image according to an image difference between the target image and each candidate image includes determining the weighting coefficient of each candidate image according to $Wk=b2-(Dk)^{a2}/h2$, where each of b2, a2, and h2 represents a positive real number, Dk represents an image difference between the first image and a $k^{th}$ candidate image, and Wk represents a weighting coefficient of the $k^{th}$ candidate image.

With reference to either of the first aspect or the foregoing implementation of the first aspect, in another implementation of the first aspect, determining a weighting coefficient of each candidate image according to an image difference between the target image and each candidate image includes determining the weighting coefficient of each candidate image according to $$Wk = \frac{h3}{b3 + (Dk)^{a3}},$$

where each of b3, a3, and h3 represents a positive real number, Dk represents an image difference between the first image and a $k^{th}$ candidate image, and Wk represents a weighting coefficient of the $k^{th}$ candidate image.

With reference to either of the first aspect or the foregoing implementation of the first aspect, in another implementation of the first aspect, determining a filtered image of the target image according to pixel values of the K candidate images and weighting coefficients of the K candidate images includes determining the filtered image according to $$Pf_j = \frac{W0 \times P0_j + \sum_{k=1}^{K} Wk \times Pk_j}{W0 + \sum_{k=1}^{K} Wk},$$

where $Pf_j$ represents a pixel value of the filtered image at a $j^{th}$ pixel point, W0 represents a weighting coefficient of the first image, Wk represents a weighting coefficient of a $k^{th}$ candidate image, $P0_j$ represents a pixel value of the first image at a $j^{th}$ pixel point, and $Pk_j$ represents a pixel value of the $k^{th}$ candidate image at a $j^{th}$ pixel point.

According to a second aspect, an image processing apparatus is provided, including a first transformation unit configured to transform a first image to obtain a first transform coefficient set; a second transformation unit configured to transform a second image in a same manner, or transform a difference image between the first image and a second image in a same manner, to obtain a second transform coefficient set; a selection unit configured to select a first group of transform coefficients from the first transform coefficient set according to magnitudes of transform coefficients in the first transform coefficient set that is obtained by the first transformation unit, where magnitudes of transform coefficients in the first group of transform coefficients meet a preset threshold condition; a determining unit configured to determine an image difference between the first image and the second image according to the first group of transform coefficients selected by the selection unit and the second transform coefficient set obtained by the second transformation unit; and a processing unit configured to process the first image and the second image according to the image difference determined by the determining unit.

With reference to the second aspect, in an implementation of the second aspect, when the second transform coefficient set is a transform coefficient set that is obtained by transforming the second image in the same manner, the determining unit is configured to select, from the second transform coefficient set according to a one-to-one correspondence between transform coefficients in the first transform coefficient set and in the second transform coefficient set, a second group of transform coefficients that is corresponding to the first group of transform coefficients; and determine the image difference according to the first group of transform coefficients and the second group of transform coefficients.

With reference to either of the second aspect or the foregoing implementation of the second aspect, in another implementation of the second aspect, the determining unit is configured to determine differences between corresponding transform coefficients in the first group of transform coefficients and in the second group of transform coefficients; and determine a sum of the differences between the corresponding transform coefficients as the image difference.

With reference to either of the second aspect or the foregoing implementation of the second aspect, in another implementation of the second aspect, both the first group of transform coefficients and the second group of transform coefficients are divided into N subgroups in a same manner; and the determining unit is configured to determine N target values, where an $i^{th}$ target value in the N target values is a sum of differences between corresponding transform coefficients in an $i^{th}$ subgroup of the first group of transform coefficients and in an $i^{th}$ subgroup of the second group of transform coefficients; and perform weighted summation on the N target values according to weighting coefficients of the N subgroups, to obtain the image difference.

With reference to either of the second aspect or the foregoing implementation of the second aspect, in another implementation of the second aspect, the determining unit is configured to determine a first target value, where the first target value is a sum of differences between corresponding transform coefficients in the first group of transform coefficients and in the second group of transform coefficients; determine a second target value, where the second target value is a sum of differences between corresponding transform coefficients in remaining transform coefficients other than the first group of transform coefficients in the first transform coefficient set and in remaining transform coefficients other than the second group of transform coefficients in the second transform coefficient set; and perform weighted summation on the first target value and the second target value according to a weighting coefficient of the first target value and a weighting coefficient of the second target value, to obtain the image difference.

With reference to any one of the second aspect or the foregoing implementations of the second aspect, in another implementation of the second aspect, when the second transform coefficient set is a transform coefficient set that is obtained by transforming the difference image between the first image and the second image in the same manner, the determining unit is configured to select, from the second transform coefficient set according to a one-to-one correspondence between transform coefficients in the first transform coefficient set and in the second transform coefficient set, a second group of transform coefficients that is corresponding to the first group of transform coefficients; and determine the image difference according to the second group of transform coefficients.

With reference to either of the second aspect or the foregoing implementation of the second aspect, in another implementation of the second aspect, the determining unit is configured to determine a sum of transform coefficients in the second group of transform coefficients as the image difference.

With reference to either of the second aspect or the foregoing implementation of the second aspect, in another implementation of the second aspect, the second group of transform coefficients includes N subgroups, and the determining unit is configured to determine N target values, where an i$^{th}$ target value is a sum of transform coefficients in an i$^{th}$ subgroup; and perform weighted summation on the N target values according to weighting coefficients of the N target values, to obtain the image difference.

With reference to either of the second aspect or the foregoing implementation of the second aspect, in another implementation of the second aspect, the determining unit is configured to determine a first target value, where the first target value is a sum of transform coefficients in the second group of transform coefficients; determine a second target value, where the second target value is a sum of remaining transform coefficients other than the second group of transform coefficients in the second transform coefficient set; and perform weighted summation on the first target value and the second target value according to a weighting coefficient of the first target value and a weighting coefficient of the second target value, to obtain the image difference.

With reference to any one of the second aspect or the foregoing implementations of the second aspect, in another implementation of the second aspect, the first image is a target image, the second image is any candidate image in K candidate images; and the processing unit is configured to determine a weighting coefficient of each candidate image according to an image difference between the target image and each candidate image; and determine a filtered image of the target image according to pixel values of the K candidate images and weighting coefficients of the K candidate images.

With reference to either of the second aspect or the foregoing implementation of the second aspect, in another implementation of the second aspect, the determining unit is configured to determine the weighting coefficient of each candidate image according to $Wk = b1^{(-(Dk)^{a1}/h1)}$, where each of b1, a1, and h1 represents a positive real number, Dk represents an image difference between the first image and a k$^{th}$ candidate image, and Wk represents a weighting coefficient of the k$^{th}$ candidate image.

With reference to either of the second aspect or the foregoing implementation of the second aspect, in another implementation of the second aspect, the determining unit is configured to determine the weighting coefficient of each candidate image according to $Wk = b2 - (Dk)^{a2}/h2$, where each of b2, a2, and h2 represents a positive real number, Dk represents an image difference between the first image and a k$^{th}$ candidate image, and Wk represents a weighting coefficient of the k$^{th}$ candidate image.

With reference to either of the second aspect or the foregoing implementation of the second aspect, in another implementation of the second aspect, the determining unit is configured to determine the weighting coefficient of each candidate image according to $$Wk = \frac{h3}{b3 + (Dk)^{a3}},$$

where each of b3, a3, and h3 represents a positive real number, Dk represents an image difference between the first image and a k$^{th}$ candidate image, and Wk represents a weighting coefficient of the k$^{th}$ candidate image.

With reference to either of the second aspect or the foregoing implementation of the second aspect, in another implementation of the second aspect, the processing unit is configured to determine the filtered image according to $$Pf_j = \frac{W0 \times P0_j + \sum_{k=1}^{K} Wk \times Pk_j}{W0 + \sum_{k=1}^{K} Wk},$$

where Pf$_j$ represents a pixel value of the filtered image at a j$^{th}$ pixel point, W0 represents a weighting coefficient of the first image, Wk represents a weighting coefficient of a k$^{th}$ candidate image, P0$_j$ represents a pixel value of the first image at a j$^{th}$ pixel point, and Pk$_j$ represents a pixel value of the k$^{th}$ candidate image at a j$^{th}$ pixel point.

According to a third aspect, a decoding method is provided, including selecting N candidate images from a knowledge base, where the N candidate images are used to determine a predicted pixel value of a to-be-decoded image, each candidate image and the to-be-decoded image are the same in both shape and size, and the to-be-decoded image includes at least one to-be-decoded image block; transforming the to-be-decoded image and each target image in N target images in a same manner, to obtain a transform coefficient set of the to-be-decoded image and a transform coefficient set of each target image, where the N target images are the N candidate images, or the N target images are images that are obtained by performing subtraction between corresponding pixel points in each of the N candidate images and in the to-be-decoded image, and transform coefficients in the transform coefficient set of the to-be-decoded image are in a one-to-one correspondence with transform coefficients in the transform coefficient set of each target image; selecting, from the transform coefficient set of the to-be-decoded image, transform coefficients with magnitudes meeting a preset threshold, to obtain a first group of transform coefficients; selecting, from the transform coefficient set of each target image according to the first group of transform coefficients, a second group of transform coefficients that is corresponding to the first group of transform coefficients; determining image differences between the to-be-decoded image and the N candidate images according to second groups, of transform coefficients, corresponding to the N target images; determining the predicted pixel value of the to-be-decoded image according to the image differences between the to-be-decoded image and the N candidate images; and decoding the to-be-decoded image according to the predicted pixel value.

With reference to the third aspect, in an implementation of the third aspect, when the N target images are the N candidate images, determining the image differences between the to-be-decoded image and the N candidate images according to second groups, of transform coefficients, corresponding to the N target images includes determining an image difference between the to-be-decoded image and each candidate image according to the first group of transform coefficients and a second group of transform coefficients that is corresponding to each candidate image.

With reference to either of the third aspect or the foregoing implementation of the third aspect, in another implementation of the third aspect, determining an image difference between the to-be-decoded image and each candidate image according to the first group of transform coefficients and a second group of transform coefficients that is corresponding to each candidate image includes determining differences between corresponding transform coefficients in the first group of transform coefficients and in the second group of transform coefficients; and performing summation on the differences between the corresponding transform coefficients, to obtain the image difference.

With reference to either of the third aspect or the foregoing implementation of the third aspect, in another implementation of the third aspect, determining an image difference between the to-be-decoded image and each candidate image according to the first group of transform coefficients and a second group of transform coefficients that is corresponding to each candidate image includes determining N target values, where the first group of transform coefficients and the second group of transform coefficients are divided into N subgroups in a same manner, and an $i^{th}$ target value in the N target values is a sum of differences between corresponding transform coefficients in an $i^{th}$ subgroup of the first group of transform coefficients and in an $i^{th}$ subgroup of the second group of transform coefficients; and performing weighted summation on the N target values according to respective weighting coefficients of the N target values, to obtain the image difference.

With reference to either of the third aspect or the foregoing implementation of the third aspect, in another implementation of the third aspect, determining an image difference between the to-be-decoded image and each candidate image according to the first group of transform coefficients and a second group of transform coefficients that is corresponding to each candidate image includes determining a first target value, where the first target value is a sum of differences between corresponding transform coefficients in the first group of transform coefficients and in the second group of transform coefficients; determining a second target value, where the second target value is a sum of differences between corresponding transform coefficients in remaining transform coefficients other than the first group of transform coefficients in the transform coefficient set of the to-be-decoded image and in remaining transform coefficients other than the second group of transform coefficients in the transform coefficient set of each candidate image; and performing weighted summation on the first target value and the second target value according to a weighting coefficient of the first target value and a weighting coefficient of the second target value, to obtain the image difference.

With reference to any one of the third aspect or the foregoing implementations of the third aspect, in another implementation of the third aspect, when the N target images are the images that are obtained by performing subtraction between the corresponding pixel points in each of the N candidate images and in the to-be-decoded image, determining the image differences between the to-be-decoded image and the N candidate images according to second groups, of transform coefficients, corresponding to the N target images includes determining, according to a second group of transform coefficients that is corresponding to each target image in the N target images, an image difference between the to-be-decoded image and a candidate image corresponding to each target image, where each target image is obtained by performing subtraction between corresponding pixel points in the candidate image corresponding to each target image and in the to-be-decoded image.

With reference to either of the third aspect or the foregoing implementation of the third aspect, in another implementation of the third aspect, determining, according to a second group of transform coefficients that is corresponding to each target image in the N target images, an image difference between the to-be-decoded image and a candidate image corresponding to each target image includes determining a sum of transform coefficients in the second group of transform coefficients as the image difference.

With reference to either of the third aspect or the foregoing implementation of the third aspect, in another implementation of the third aspect, determining, according to a second group of transform coefficients that is corresponding to each target image in the N target images, an image difference between the to-be-decoded image and a candidate image corresponding to each target image includes determining N target values, where the second group of transform coefficients is divided into N subgroups, and an $i^{th}$ target value in the N target values is a sum of transform coefficients in an $i^{th}$ subgroup; and performing weighted summation on the N target values according to weighting coefficients of the N target values, to obtain the image difference.

With reference to either of the third aspect or the foregoing implementation of the third aspect, in another implementation of the third aspect, determining, according to a second group of transform coefficients that is corresponding to each target image in the N target images, an image difference between the to-be-decoded image and a candidate image corresponding to each target image includes determining a first target value, where the first target value is a sum of transform coefficients in the second group of transform coefficients; determining a second target value, where the second target value is a sum of remaining transform coefficients other than the second group of transform coefficients in the transform coefficient set of each target image; and performing weighted summation on the first target value and the second target value according to a weighting coefficient of the first target value and a weighting coefficient of the second target value, to obtain the image difference.

With reference to any one of the third aspect or the foregoing implementations of the third aspect, in another implementation of the third aspect, determining the predicted pixel value of the to-be-decoded image according to the image differences between the to-be-decoded image and the N multiple candidate images includes selecting, from the multiple candidate images according to the image differences between the to-be-decoded image and the multiple candidate images, a candidate image with a minimum image difference; and determining a pixel value of the candidate image with the minimum image difference as the predicted pixel value of the to-be-decoded image.

With reference to any one of the third aspect or the foregoing implementations of the third aspect, in another implementation of the third aspect, determining the predicted pixel value of the to-be-decoded image according to the image differences between the to-be-decoded image and the multiple candidate images includes selecting, from the multiple candidate images according to the image differences between the to-be-decoded image and the multiple candidate images, E candidate images with minimum image differences, where E≥2; determining a weight of each candidate image according to an image difference between the to-be-decoded image and each candidate image in the E candidate images; and performing weighted average on pixel values of the E candidate images according to weights of the E candidate images, to obtain the predicted pixel value of the to-be-decoded image.

With reference to any one of the third aspect or the foregoing implementations of the third aspect, in another implementation of the third aspect, selecting N candidate images from a knowledge base includes obtaining, from a bitstream, indexes of the N candidate images in the knowledge base; and selecting the N candidate images from the knowledge base according to the indexes.

According to a fourth aspect, a coding method is provided, including selecting N candidate images from a knowledge base, where the N candidate images are used to determine a predicted pixel value of a to-be-coded image, each candidate image and the to-be-coded image are the same in both shape and size, and the to-be-coded image includes at least one to-be-coded image block; transforming the to-be-coded image and each target image in N target images in a same manner, to obtain a transform coefficient set of the to-be-coded image and a transform coefficient set of each target image, where the N target images are the N candidate images, or the N target images are images that are obtained by performing subtraction between corresponding pixel points in each of the N candidate images and in the to-be-coded image, transform coefficients in the transform coefficient set of the to-be-coded image are in a one-to-one correspondence with transform coefficients in the transform coefficient set of each target image; selecting, from the transform coefficient set of the to-be-coded image, transform coefficients with magnitudes meeting a preset threshold, to obtain a first group of transform coefficients; selecting, from the transform coefficient set of each target image according to the first group of transform coefficients, a second group of transform coefficients that is corresponding to the first group of transform coefficients; determining image differences between the to-be-coded image and the N candidate images according to second groups, of transform coefficients, corresponding to the N target images; determining the predicted pixel value of the to-be-coded image according to the image differences between the to-be-coded image and the N candidate images; and coding the to-be-coded image according to the predicted pixel value.

With reference to the fourth aspect, in an implementation of the fourth aspect, when the N target images are the N candidate images, the determining image differences between the to-be-coded image and the N candidate images according to second groups, of transform coefficients, corresponding to the N target images includes determining an image difference between the to-be-coded image and each candidate image according to the first group of transform coefficients and a second group of transform coefficients that is corresponding to each candidate image.

With reference to either of the fourth aspect or the foregoing implementation of the fourth aspect, in another implementation of the fourth aspect, determining an image difference between the to-be-coded image and each candidate image according to the first group of transform coefficients and a second group of transform coefficients that is corresponding to each candidate image includes determining differences between corresponding transform coefficients in the first group of transform coefficients and in the second group of transform coefficients; and performing summation on the differences between the corresponding transform coefficients, to obtain the image difference.

With reference to either of the fourth aspect or the foregoing implementation of the fourth aspect, in another implementation of the fourth aspect, determining an image difference between the to-be-coded image and each candidate image according to the first group of transform coefficients and a second group of transform coefficients that is corresponding to each candidate image includes determining N target values, where the first group of transform coefficients and the second group of transform coefficients are divided into N subgroups in a same manner, and an $i^{th}$ target value in the N target values is a sum of differences between corresponding transform coefficients in an $i^{th}$ subgroup of the first group of transform coefficients and in an $i^{th}$ subgroup of the second group of transform coefficients; and performing weighted summation on the N target values according to respective weighting coefficients of the N target values, to obtain the image difference.

With reference to either of the fourth aspect or the foregoing implementation of the fourth aspect, in another implementation of the fourth aspect, determining an image difference between the to-be-coded image and each candidate image according to the first group of transform coefficients and a second group of transform coefficients that is corresponding to each candidate image includes determining a first target value, where the first target value is a sum of differences between corresponding transform coefficients in the first group of transform coefficients and in the second group of transform coefficients; determining a second target value, where the second target value is a sum of differences between corresponding transform coefficients in remaining transform coefficients other than the first group of transform coefficients in the transform coefficient set of the to-be-coded image and in remaining transform coefficients other than the second group of transform coefficients in the transform coefficient set of each candidate image; and performing weighted summation on the first target value and the second target value according to a weighting coefficient of the first target value and a weighting coefficient of the second target value, to obtain the image difference.

With reference to any one of the fourth aspect or the foregoing implementations of the fourth aspect, in another implementation of the fourth aspect, when the N target images are the images that are obtained by performing subtraction between the corresponding pixel points in each of the N candidate images and in the to-be-coded image, the determining image differences between the to-be-coded image and the N candidate images according to second groups, of transform coefficients, corresponding to the N target images includes determining, according to a second group of transform coefficients that is corresponding to each target image in the N target images, an image difference between the to-be-coded image and a candidate image corresponding to each target image, where each target image is obtained by performing subtraction between corresponding pixel points in the candidate image corresponding to each target image and in the to-be-coded image.

With reference to either of the fourth aspect or the foregoing implementation of the fourth aspect, in another implementation of the fourth aspect, determining, according to a second group of transform coefficients that is corresponding to each target image in the N target images, an image difference between the to-be-coded image and a candidate image corresponding to each target image includes determining a sum of transform coefficients in the second group of transform coefficients as the image difference.

With reference to either of the fourth aspect or the foregoing implementation of the fourth aspect, in another implementation of the fourth aspect, determining, according to a second group of transform coefficients that is corresponding to each target image in the N target images, an image difference between the to-be-coded image and a candidate image corresponding to each target image includes determining N target values, where the second group of transform coefficients is divided into N subgroups, and an $i^{th}$ target value in the N target values is a sum of transform coefficients in an $i^{th}$ subgroup; and performing weighted summation on the N target values according to weighting coefficients of the N target values, to obtain the image difference.

With reference to either of the fourth aspect or the foregoing implementation of the fourth aspect, in another implementation of the fourth aspect, determining, according to a second group of transform coefficients that is corresponding to each target image in the N target images, an image difference between the to-be-coded image and a candidate image corresponding to each target image includes determining a first target value, where the first target value is a sum of salient transform coefficients in the second group of transform coefficients; determining a second target value, where the second target value is a sum of remaining transform coefficients other than the second group of transform coefficients in the transform coefficient set of each image; and performing weighted summation on the first target value and the second target value according to a weighting coefficient of the first target value and a weighting coefficient of the second target value, to obtain the image difference.

With reference to any one of the fourth aspect or the foregoing implementations of the fourth aspect, in another implementation of the fourth aspect, determining the predicted pixel value of the to-be-coded image according to the image differences between the to-be-coded image and the multiple candidate images includes selecting, from the multiple candidate images according to the image differences between the to-be-coded image and the multiple candidate images, a candidate image with a minimum image difference; and determining a pixel value of the candidate image with the minimum difference as the predicted pixel value of the to-be-coded image.

With reference to any one of the fourth aspect or the foregoing implementations of the fourth aspect, in another implementation of the fourth aspect, determining the predicted pixel value of the to-be-coded image according to the image differences between the to-be-coded image and the multiple candidate images includes selecting, from the multiple candidate images according to the image differences between the to-be-coded image and the multiple candidate images, E candidate images with minimum image differences, where E≥2; determining a weight of each candidate image according to an image difference between the to-be-coded image and each candidate image in the E candidate images; and performing weighted average on pixel values of the E candidate images according to weights of the E candidate images, to obtain the predicted pixel value of the to-be-coded image.

With reference to any one of the fourth aspect or the foregoing implementations of the fourth aspect, in another implementation of the fourth aspect, the method further includes writing indexes of the N candidate images in the knowledge base into a bitstream.

According to a fifth aspect, a decoder is provided, including a first selection unit configured to select N candidate images from a knowledge base, where the N candidate images are used to determine a predicted pixel value of a to-be-decoded image, each candidate image and the to-be-decoded image are the same in both shape and size, and the to-be-decoded image includes at least one to-be-decoded image block; a transformation unit configured to transform the to-be-decoded image and each target image in N target images in a same manner, to obtain a transform coefficient set of the to-be-decoded image and a transform coefficient set of each target image, where the N target images are the N candidate images, or the N target images are images that are obtained by performing subtraction between corresponding pixel points in each of the N candidate images and in the to-be-decoded image, and transform coefficients in the transform coefficient set of the to-be-decoded image are in a one-to-one correspondence with transform coefficients in the transform coefficient set of each target image; a second selection unit configured to select, from the transform coefficient set of the to-be-decoded image, transform coefficients with magnitudes meeting a preset threshold, to obtain a first group of transform coefficients; a third selection unit configured to select, from the transform coefficient set of each target image according to the first group of transform coefficients, a second group of transform coefficients that is corresponding to the first group of transform coefficients; a first determining unit configured to determine image differences between the to-be-decoded image and the N candidate images according to second groups, of transform coefficients, corresponding to the N target images; a second determining unit configured to determine the predicted pixel value of the to-be-decoded image according to the image differences between the to-be-decoded image and the N candidate images; and a decoding unit configured to decode the to-be-decoded image according to the predicted pixel value.

With reference to the fifth aspect, in an implementation of the fifth aspect, when the N target images are the N candidate images, the first determining unit is configured to determine an image difference between the to-be-decoded image and each candidate image according to the first group of transform coefficients and a second group of transform coefficients that is corresponding to each candidate image.

With reference to either of the fifth aspect or the foregoing implementation of the fifth aspect, in another implementation of the fifth aspect, the first determining unit is configured to determine differences between corresponding transform coefficients in the first group of transform coefficients and in the second group of transform coefficients; and perform summation on the differences between the corresponding transform coefficients, to obtain the image difference.

With reference to either of the fifth aspect or the foregoing implementation of the fifth aspect, in another implementation of the fifth aspect, the first determining unit is configured to determine N target values, where the first group of transform coefficients and the second group of transform coefficients are divided into N subgroups in a same manner, and an $i^{th}$ target value in the N target values is a sum of differences between corresponding transform coefficients in an $i^{th}$ subgroup of the first group of transform coefficients and in an $i^{th}$ subgroup of the second group of transform coefficients; and perform weighted summation on the N target values according to respective weighting coefficients of the N target values, to obtain the image difference.

With reference to either of the fifth aspect or the foregoing implementation of the fifth aspect, in another implementation of the fifth aspect, the first determining unit is configured to determine a first target value, where the first target value is a sum of differences between corresponding transform coefficients in the first group of transform coefficients and in the second group of transform coefficients; determine a second target value, where the second target value is a sum of differences between corresponding transform coefficients in remaining transform coefficients other than the first group of transform coefficients in the transform coefficient set of the to-be-decoded image and in remaining transform coefficients other than the second group of transform coefficients in the transform coefficient set of each candidate image; and perform weighted summation on the first target value and the second target value according to a weighting coefficient of the first target value and a weighting coefficient of the second target value, to obtain the image difference.

With reference to any one of the fifth aspect or the foregoing implementations of the fifth aspect, in another implementation of the fifth aspect, when the N target images are the images that are obtained by performing subtraction between the corresponding pixel points in each of the N candidate images and in the to-be-decoded image, the first determining unit is configured to determine, according to a second group of transform coefficients that is corresponding to each target image in the N target images, an image difference between the to-be-decoded image and a candidate image corresponding to each target image, where each target image is obtained by performing subtraction between corresponding pixel points in the candidate image corresponding to each target image and in the to-be-decoded image.

With reference to either of the fifth aspect or the foregoing implementation of the fifth aspect, in another implementation of the fifth aspect, the first determining unit is configured to determine a sum of transform coefficients in the second group of transform coefficients as the image difference.

With reference to either of the fifth aspect or the foregoing implementation of the fifth aspect, in another implementation of the fifth aspect, the first determining unit is configured to determine N target values, where the second group of transform coefficients is divided into N subgroups, and an $i^{th}$ target value in the N target values is a sum of transform coefficients in an $i^{th}$ subgroup; and perform weighted summation on the N target values according to weighting coefficients of the N target values, to obtain the image difference.

With reference to either of the fifth aspect or the foregoing implementation of the fifth aspect, in another implementation of the fifth aspect, the first determining unit is configured to determine a first target value, where the first target value is a sum of salient transform coefficients in the second group of transform coefficients; determine a second target value, where the second target value is a sum of remaining transform coefficients other than the second group of transform coefficients in the transform coefficient set of each image; and perform weighted summation on the first target value and the second target value according to a weighting coefficient of the first target value and a weighting coefficient of the second target value, to obtain the image difference.

With reference to any one of the fifth aspect or the foregoing implementations of the fifth aspect, in another implementation of the fifth aspect, the second determining unit is configured to select, from the multiple candidate images according to the image differences between the to-be-decoded image and the multiple candidate images, a candidate image with a minimum image difference; and determine a pixel value of the candidate image with the minimum difference as the predicted pixel value of the to-be-decoded image.

With reference to any one of the fifth aspect or the foregoing implementations of the fifth aspect, in another implementation of the fifth aspect, the second determining unit is configured to select, from the multiple candidate images according to the image differences between the to-be-decoded image and the multiple candidate images, E candidate images with minimum image differences, where E≥2; determine a weight of each candidate image according to an image difference between the to-be-decoded image and each candidate image in the E candidate images; and perform weighted average on pixel values of the E candidate images according to weights of the E candidate images, to obtain the predicted pixel value of the to-be-decoded image.

With reference to any one of the fifth aspect or the foregoing implementations of the fifth aspect, in another implementation of the fifth aspect, the first selection unit is configured to obtain, from a bitstream, indexes of the N candidate images in the knowledge base; and select the N candidate images from the knowledge base according to the indexes.

According to a sixth aspect, a coder is provided, including a first selection unit configured to select N candidate images from a knowledge base, where the N candidate images are used to determine a predicted pixel value of a to-be-coded image, each candidate image and the to-be-coded image are the same in both shape and size, and the to-be-coded image includes at least one to-be-coded image block; a transformation unit configured to transform the to-be-coded image and each target image in N target images in a same manner, to obtain a transform coefficient set of the to-be-coded image and a transform coefficient set of each target image, where the N target images are the N candidate images, or the N target images are images that are obtained by performing subtraction between corresponding pixel points in each of the N candidate images and in the to-be-coded image, and transform coefficients in the transform coefficient set of the to-be-coded image are in a one-to-one correspondence with transform coefficients in the transform coefficient set of each target image; a second selection unit configured to select, from the transform coefficient set of the to-be-coded image, transform coefficients with magnitudes meeting a preset threshold, to obtain a first group of transform coefficients; a third selection unit configured to select, from the transform coefficient set of each target image according to the first group of transform coefficients, a second group of transform coefficients that is corresponding to the first group of transform coefficients; a first determining unit configured to determine image differences between the to-be-coded image and the N candidate images according to second groups, of transform coefficients, corresponding to the N target images; a second determining unit configured to determine the predicted pixel value of the to-be-coded image according to the image differences between the to-be-coded image and the N candidate images; and a coding unit configured to code the to-be-coded image according to the predicted pixel value.

With reference to the sixth aspect, in an implementation of the sixth aspect, when the N target images are the N candidate images, the first determining unit is configured to determine an image difference between the to-be-coded image and each candidate image according to the first group of transform coefficients and a second group of transform coefficients that is corresponding to each candidate image.

With reference to either of the sixth aspect or the foregoing implementation of the sixth aspect, in another implementation of the sixth aspect, the first determining unit is configured to determine differences between corresponding transform coefficients in the first group of transform coefficients and in the second group of transform coefficients; and perform summation on the differences between the corresponding transform coefficients, to obtain the image difference.

With reference to either of the sixth aspect or the foregoing implementation of the sixth aspect, in another implementation of the sixth aspect, the first determining unit is configured to determine N target values, where the first group of transform coefficients and the second group of transform coefficients are divided into N subgroups in a same manner, and an $i^{th}$ target value in the N target values is a sum of differences between corresponding transform coefficients in an $i^{th}$ subgroup of the first group of transform coefficients and in an $i^{th}$ subgroup of the second group of transform coefficients; and perform weighted summation on the N target values according to respective weighting coefficients of the N target values, to obtain the image difference.

With reference to either of the sixth aspect or the foregoing implementation of the sixth aspect, in another implementation of the sixth aspect, the first determining unit is configured to determine a first target value, where the first target value is a sum of differences between corresponding transform coefficients in the first group of transform coefficients and in the second group of transform coefficients; determine a second target value, where the second target value is a sum of differences between corresponding transform coefficients in remaining transform coefficients other than the first group of transform coefficients in the transform coefficient set of the to-be-coded image and in remaining transform coefficients other than the second group of transform coefficients in the transform coefficient set of each candidate image; and perform weighted summation on the first target value and the second target value according to a weighting coefficient of the first target value and a weighting coefficient of the second target value, to obtain the image difference.

With reference to any one of the sixth aspect or the foregoing implementations of the sixth aspect, in another implementation of the sixth aspect, when the N target images are the images that are obtained by performing subtraction between the corresponding pixel points in each of the N candidate images and in the to-be-coded image, the first determining unit is configured to determine, according to a second group of transform coefficients that is corresponding to each target image in the N target images, an image difference between the to-be-coded image and a candidate image corresponding to each target image, where each target image is obtained by performing subtraction between corresponding pixel points in the candidate image corresponding to each target image and in the to-be-coded image.

With reference to either of the sixth aspect or the foregoing implementation of the sixth aspect, in another implementation of the sixth aspect, the first determining unit is configured to determine a sum of transform coefficients in the second group of transform coefficients as the image difference.

With reference to either of the sixth aspect or the foregoing implementation of the sixth aspect, in another implementation of the sixth aspect, the first determining unit is configured to determine N target values, where the second group of transform coefficients is divided into N subgroups, and an $i^{th}$ target value in the N target values is a sum of transform coefficients in an $i^{th}$ subgroup; and perform weighted summation on the N target values according to weighting coefficients of the N target values, to obtain the image difference.

With reference to either of the sixth aspect or the foregoing implementation of the sixth aspect, in another implementation of the sixth aspect, the first determining unit is configured to determine a first target value, where the first target value is a sum of salient transform coefficients in the second group of transform coefficients; determine a second target value, where the second target value is a sum of remaining transform coefficients other than the second group of transform coefficients in the transform coefficient set of each image; and perform weighted summation on the first target value and the second target value according to a weighting coefficient of the first target value and a weighting coefficient of the second target value, to obtain the image difference.

With reference to any one of the sixth aspect or the foregoing implementations of the sixth aspect, in another implementation of the sixth aspect, the second determining unit is configured to select, from the multiple candidate images according to the image differences between the to-be-coded image and the multiple candidate images, a candidate image with a minimum image difference; and determine a pixel value of the candidate image with the minimum difference as the predicted pixel value of the to-be-coded image.

With reference to any one of the sixth aspect or the foregoing implementations of the sixth aspect, in another implementation of the sixth aspect, the second determining unit is configured to select, from the multiple candidate images according to the image differences between the to-be-coded image and the multiple candidate images, E candidate images with minimum image differences, where E≥2; determine a weight of each candidate image according to an image difference between the to-be-coded image and each candidate image in the E candidate images; and perform weighted average on pixel values of the E candidate images according to weights of the E candidate images, to obtain the predicted pixel value of the to-be-coded image.

With reference to any one of the sixth aspect or the foregoing implementations of the sixth aspect, in another implementation of the sixth aspect, the coder further includes a writing unit configured to write indexes of the N candidate images in the knowledge base into a bitstream.

According to a seventh aspect, a decoder is provided configured to select N candidate images from a knowledge base, where the N candidate images are used to determine a predicted pixel value of a to-be-decoded image, each candidate image and the to-be-decoded image are the same in both shape and size, and the to-be-decoded image includes at least one to-be-decoded image block; transform the to-be-decoded image and each target image in N target images in a same manner, to obtain a transform coefficient set of the to-be-decoded image and a transform coefficient set of each target image, where the N target images are the N candidate images, or the N target images are images that are obtained by performing subtraction between corresponding pixel points in each of the N candidate images and in the to-be-decoded image, and transform coefficients in the transform coefficient set of the to-be-decoded image are in a one-to-one correspondence with transform coefficients in the transform coefficient set of each target image; select, from the transform coefficient set of the to-be-decoded image, transform coefficients with magnitudes meeting a preset threshold, to obtain a first group of transform coefficients; select, from the transform coefficient set of each target image according to the first group of transform coefficients, a second group of transform coefficients that is corresponding to the first group of transform coefficients; determine image differences between the to-be-decoded image and the N candidate images according to second groups, of transform coefficients, corresponding to the N target images; determine the predicted pixel value of the to-be-decoded image according to the image differences between the to-be-decoded image and the N candidate images; and decode the to-be-decoded image according to the predicted pixel value.

With reference to the seventh aspect, in an implementation of the seventh aspect, when the N target images are the N candidate images, the decoder is configured to determine an image difference between the to-be-decoded image and each candidate image according to the first group of transform coefficients and a second group of transform coefficients that is corresponding to each candidate image.

With reference to either of the seventh aspect or the foregoing implementation of the seventh aspect, in another implementation of the seventh aspect, the decoder is configured to determine differences between corresponding transform coefficients in the first group of transform coefficients and in the second group of transform coefficients; and perform summation on the differences between the corresponding transform coefficients, to obtain the image difference.

With reference to either of the seventh aspect or the foregoing implementation of the seventh aspect, in another implementation of the seventh aspect, the decoder is configured to determine N target values, where the first group of transform coefficients and the second group of transform coefficients are divided into N subgroups in a same manner, and an $i^{th}$ target value in the N target values is a sum of differences between corresponding transform coefficients in an $i^{th}$ subgroup of the first group of transform coefficients and in an $i^{th}$ subgroup of the second group of transform coefficients; and perform weighted summation on the N target values according to respective weighting coefficients of the N target values, to obtain the image difference.

With reference to either of the seventh aspect or the foregoing implementation of the seventh aspect, in another implementation of the seventh aspect, the decoder is configured to determine a first target value, where the first target value is a sum of differences between corresponding transform coefficients in the first group of transform coefficients and in the second group of transform coefficients; determine a second target value, where the second target value is a sum of differences between corresponding transform coefficients in remaining transform coefficients other than the first group of transform coefficients in the transform coefficient set of the to-be-decoded image and in remaining transform coefficients other than the second group of transform coefficients in the transform coefficient set of each candidate image; and perform weighted summation on the first target value and the second target value according to a weighting coefficient of the first target value and a weighting coefficient of the second target value, to obtain the image difference.

With reference to any one of the seventh aspect or the foregoing implementations of the seventh aspect, in another implementation of the seventh aspect, when the N target images are the images that are obtained by performing subtraction between the corresponding pixel points in each of the N candidate images and in the to-be-decoded image, the decoder is configured to determine, according to a second group of transform coefficients that is corresponding to each target image in the N target images, an image difference between the to-be-decoded image and a candidate image corresponding to each target image, where each target image is obtained by performing subtraction between corresponding pixel points in the candidate image corresponding to each target image and in the to-be-decoded image.

With reference to either of the seventh aspect or the foregoing implementation of the seventh aspect, in another implementation of the seventh aspect, the decoder is configured to determine a sum of transform coefficients in the second group of transform coefficients as the image difference.

With reference to either of the seventh aspect or the foregoing implementation of the seventh aspect, in another implementation of the seventh aspect, the decoder is configured to determine N target values, where the second group of transform coefficients is divided into N subgroups, and an $i^{th}$ target value in the N target values is a sum of transform coefficients in an $i^{th}$ subgroup; and perform weighted summation on the N target values according to weighting coefficients of the N target values, to obtain the image difference.

With reference to either of the seventh aspect or the foregoing implementation of the seventh aspect, in another implementation of the seventh aspect, the decoder is configured to determine a first target value, where the first target value is a sum of salient transform coefficients in the second group of transform coefficients; determine a second target value, where the second target value is a sum of remaining transform coefficients other than the second group of transform coefficients in the transform coefficient set of each image; and perform weighted summation on the first target value and the second target value according to a weighting coefficient of the first target value and a weighting coefficient of the second target value, to obtain the image difference.

With reference to any one of the seventh aspect or the foregoing implementations of the seventh aspect, in another implementation of the seventh aspect, the decoder is configured to select, from the multiple candidate images according to the image differences between the to-be-decoded image and the multiple candidate images, a candidate image with a minimum image difference; and determine a pixel value of the candidate image with the minimum difference as the predicted pixel value of the to-be-decoded image.

With reference to any one of the seventh aspect or the foregoing implementations of the seventh aspect, in another implementation of the seventh aspect, the decoder is configured to select, from the multiple candidate images according to the image differences between the to-be-decoded image and the multiple candidate images, E candidate images with minimum image differences, where E≥2; determine a weight of each candidate image according to an image difference between the to-be-decoded image and each candidate image in the E candidate images; and perform weighted average on pixel values of the E candidate images according to weights of the E candidate images, to obtain the predicted pixel value of the to-be-decoded image.

With reference to any one of the seventh aspect or the foregoing implementations of the seventh aspect, in another implementation of the seventh aspect, the decoder is configured to obtain, from a bitstream, indexes of the N candidate images in the knowledge base; and select the N candidate images from the knowledge base according to the indexes.

According to an eighth aspect, a coder is provided configured to select N candidate images from a knowledge base, where the N candidate images are used to determine a predicted pixel value of a to-be-coded image, each candidate image and the to-be-coded image are the same in both shape and size, and the to-be-coded image includes at least one to-be-coded image block; transform the to-be-coded image and each target image in N target images in a same manner, to obtain a transform coefficient set of the to-be-coded image and a transform coefficient set of each target image, where the N target images are the N candidate images, or the N target images are images that are obtained by performing subtraction between corresponding pixel points in each of the N candidate images and in the to-be-coded image, and transform coefficients in the transform coefficient set of the to-be-coded image are in a one-to-one correspondence with transform coefficients in the transform coefficient set of each target image; select, from the transform coefficient set of the to-be-coded image, transform coefficients with magnitudes meeting a preset threshold, to obtain a first group of transform coefficients; select, from the transform coefficient set of each target image according to the first group of transform coefficients, a second group of transform coefficients that is corresponding to the first group of transform coefficients; determine image differences between the to-be-coded image and the N candidate images according to second groups, of transform coefficients, corresponding to the N target images; determine the predicted pixel value of the to-be-coded image according to the image differences between the to-be-coded image and the N candidate images; and code the to-be-coded image according to the predicted pixel value.

With reference to the eighth aspect, in an implementation of the eighth aspect, when the N target images are the N candidate images, the coder is configured to determine an image difference between the to-be-coded image and each candidate image according to the first group of transform coefficients and a second group of transform coefficients that is corresponding to each candidate image.

With reference to either of the eighth aspect or the foregoing implementation of the eighth aspect, in another implementation of the eighth aspect, the coder is configured to determine differences between corresponding transform coefficients in the first group of transform coefficients and in the second group of transform coefficients; and perform summation on the differences between the corresponding transform coefficients, to obtain the image difference.

With reference to either of the eighth aspect or the foregoing implementation of the eighth aspect, in another implementation of the eighth aspect, the coder is configured to determine N target values, where the first group of transform coefficients and the second group of transform coefficients are divided into N subgroups in a same manner, and an $i^{th}$ target value in the N target values is a sum of differences between corresponding transform coefficients in an $i^{th}$ subgroup of the first group of transform coefficients and in an $i^{th}$ subgroup of the second group of transform coefficients; and perform weighted summation on the N target values according to respective weighting coefficients of the N target values, to obtain the image difference.

With reference to either of the eighth aspect or the foregoing implementation of the eighth aspect, in another implementation of the eighth aspect, the coder is configured to determine a first target value, where the first target value is a sum of differences between corresponding transform coefficients in the first group of transform coefficients and in the second group of transform coefficients; determine a second target value, where the second target value is a sum of differences between corresponding transform coefficients in remaining transform coefficients other than the first group of transform coefficients in the transform coefficient set of the to-be-coded image and in remaining transform coefficients other than the second group of transform coefficients in the transform coefficient set of each candidate image; and perform weighted summation on the first target value and the second target value according to a weighting coefficient of the first target value and a weighting coefficient of the second target value, to obtain the image difference.

With reference to any one of the eighth aspect or the foregoing implementations of the eighth aspect, in another implementation of the eighth aspect, when the N target images are the images that are obtained by performing subtraction between the corresponding pixel points in each of the N candidate images and in the to-be-coded image, the coder is configured to determine, according to a second group of transform coefficients that is corresponding to each target image in the N target images, an image difference between the to-be-coded image and a candidate image corresponding to each target image, where each target image is obtained by performing subtraction between corresponding pixel points in the candidate image corresponding to each target image and in the to-be-coded image.

With reference to either of the eighth aspect or the foregoing implementation of the eighth aspect, in another implementation of the eighth aspect, the coder is configured to determine a sum of transform coefficients in the second group of transform coefficients as the image difference.

With reference to either of the eighth aspect or the foregoing implementation of the eighth aspect, in another implementation of the eighth aspect, the coder is configured to determine N target values, where the second group of transform coefficients is divided into N subgroups, and an $i^{th}$ target value in the N target values is a sum of transform coefficients in an $i^{th}$ subgroup; and perform weighted summation on the N target values according to weighting coefficients of the N target values, to obtain the image difference.

With reference to either of the eighth aspect or the foregoing implementation of the eighth aspect, in another implementation of the eighth aspect, the coder is configured to determine a first target value, where the first target value is a sum of salient transform coefficients in the second group of transform coefficients; determine a second target value, where the second target value is a sum of remaining transform coefficients other than the second group of transform coefficients in the transform coefficient set of each image; and perform weighted summation on the first target value and the second target value according to a weighting coefficient of the first target value and a weighting coefficient of the second target value, to obtain the image difference.

With reference to any one of the eighth aspect or the foregoing implementations of the eighth aspect, in another implementation of the eighth aspect, the coder is configured to select, from the multiple candidate images according to the image differences between the to-be-coded image and the multiple candidate images, a candidate image with a minimum image difference; and determine a pixel value of the candidate image with the minimum difference as the predicted pixel value of the to-be-coded image.

With reference to any one of the eighth aspect or the foregoing implementations of the eighth aspect, in another implementation of the eighth aspect, the coder is configured to select, from the multiple candidate images according to the image differences between the to-be-coded image and the multiple candidate images, E candidate images with minimum image differences, where E≥2; determine a weight of each candidate image according to an image difference between the to-be-coded image and each candidate image in the E candidate images; and perform weighted average on pixel values of the E candidate images according to weights of the E candidate images, to obtain the predicted pixel value of the to-be-coded image.

With reference to any one of the eighth aspect or the foregoing implementations of the eighth aspect, in another implementation of the eighth aspect, the coder is further configured to write indexes of the N candidate images in the knowledge base into a bitstream.

In the embodiments of the present disclosure, a transform coefficient with a magnitude meeting a preset threshold condition can better reflect main structure information of an image, and an image difference determined by using the transform coefficient with the magnitude meeting the preset threshold condition can well reflect a difference degree between images, so that subsequent image processing based on the image difference is more accurate.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
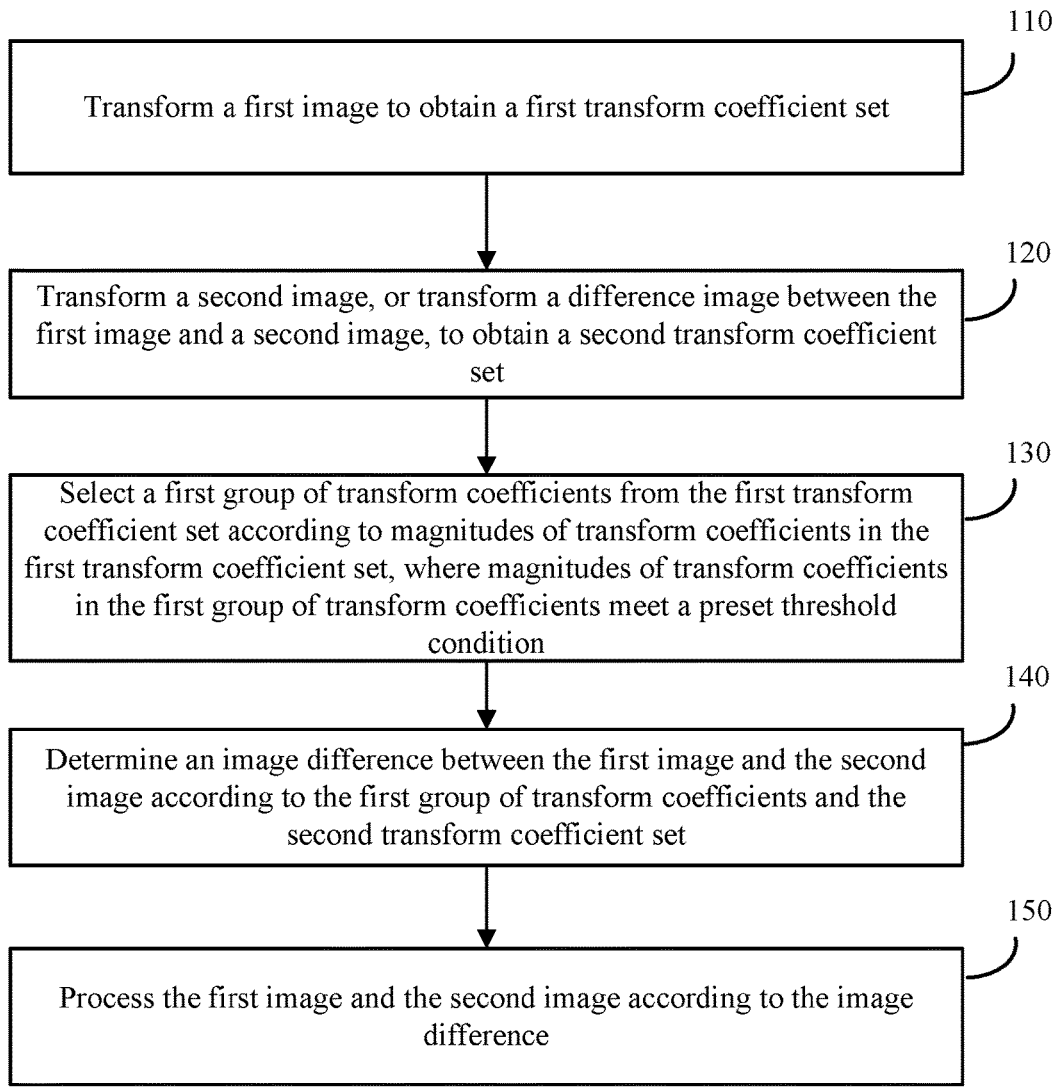
FIG. 1 is a schematic flowchart of an image processing method according to an embodiment of the present disclosure.

FIG. 1 is a schematic flowchart of an image processing method according to an embodiment of the present disclosure. The method in FIG. 1 includes the following steps.

Step 110. Transform a first image to obtain a first transform coefficient set.

Step 120. Transform a second image, or transform a difference image between the first image and a second image, to obtain a second transform coefficient set.

It should be understood that an image in this embodiment of the present disclosure may also be referred to as a patch. The difference image between the first image and the second image may be an image that is obtained by performing subtraction between corresponding pixel points in the first image and in the second image.

It should be understood that the first image and the second image may be image regions in a same shape and same size, and include a same quantity of pixels. The shapes of the first image and the second image may be, for example, a rectangle, an L-shape, a triangle, a rhombus, a trapezoid, or a hexagon.

In addition, the first image may be a predicted image of a decoding prediction unit, or a reconstructed image of a template corresponding to a decoding prediction unit, or a reconstructed image of a preset shape in a decoded image. The second image may be a high-quality image in a decoder side knowledge base, for example, an original image pre-stored in the knowledge base, or the second image may be a partial region in a decoded image.

In addition, the first image and the second image are separately transformed in a same manner, to obtain the first transform coefficient set and the second transform coefficient set. Multiple common transformation manners may be used for transformation herein, for example, discrete cosine transform (DCT), discrete sine transform (DST), Hadamard transform, wavelet transform, and scale-invariant feature transform (SIFT). Using the DCT transform as an example, when an image is a rectangular image, the image may be transformed into a two-dimensional transform matrix by means of two-dimensional DCT transform; or pixels in the image may be arranged into a one-dimensional vector, and the image is transformed into a one-dimensional vector by means of one-dimensional DCT transform. For another example, when an image is a triangular image, pixels in the image may be arranged into a one-dimensional vector, and one-dimensional DCT transform is performed, or the image may be re-arranged into a rectangle, and two-dimensional DCT transform is performed.

In addition, a transform coefficient set may be a set consisting of transform coefficients that are obtained by transforming the image, and may include all transform coefficients that are obtained by transforming the image, or may include some coefficients in all transform coefficients, for example, transform coefficients in several preset coefficient locations. For example, a transform coefficient set may include N transform coefficients $C_i$ (i=1, 2, ..., N), and each transform coefficient may correspond to an index i, where N is a positive integer. The first transform coefficient set and the second transform coefficient set may use a same transform coefficient indexing manner. There may be multiple indexing manners. For example, when two-dimensional DCT transform is used to obtain a transform coefficient matrix, transform coefficients may be indexed in a zigzag scanning sequence, or the transform coefficients may be indexed in a left-to-right and top-to-bottom sequence.

During transformation, one or more color space components of pixels may be transformed. For example, only one color space component (such as a luminance component) may be transformed, and one image difference is obtained subsequently; or multiple color space components may be separately transformed, multiple image differences are obtained subsequently, and then the image differences of the color space components are averaged to obtain a final image difference. Certainly, all the color space components may also be combined together, and transformed at the same time, and one image difference is obtained subsequently.

Step 130. Select a first group of transform coefficients from the first transform coefficient set according to magnitudes of transform coefficients in the first transform coefficient set, where magnitudes of transform coefficients in the first group of transform coefficients meet a preset threshold condition.

The preset threshold condition may include the magnitudes of the transform coefficients in the first group of transform coefficients are not less than magnitudes of remaining transform coefficients other than the first group of transform coefficients in the first transform coefficient set; or a magnitude of any transform coefficient in the first group of transform coefficients is not less than a threshold corresponding to the transform coefficient.

For example, the first group of transform coefficients may be obtained from the first transform coefficient set in either of the following two processing manners.

In a first processing manner, whether a magnitude of each transform coefficient $C_i$ in the first transform coefficient set exceeds a threshold $TH_i$ is determined; and if the magnitude of the coefficient exceeds the threshold, the coefficient is added to the first group of transform coefficients. The threshold $TH_i$ that is used for comparison with each transform coefficient may be the same or different. The threshold may be a preset constant, or x times a quantization step corresponding to the first image (x is a positive real number). When the first image is an image in a decoded image, the threshold may further be extracted from a bitstream corresponding to the decoded image.

In a second processing manner, M coefficients with greatest magnitudes are selected from the first transform coefficient set and used as salient transform coefficients, where M is a positive integer. For example, M is 4, 8, 15, 16, 20, or 32.

It should be noted that which transform coefficients in the first transform coefficient set are the first group of transform coefficients may be indicated by using transform coefficient information. The transform coefficient information may be in multiple forms. For example, the transform coefficient information may be indexes of the first group of transform coefficients in the first transform coefficient set. For another example, the transform coefficient information may be an array, a quantity of dimensions of the array is the same as a quantity of the transform coefficients in the first transform coefficient set, and each element in the array indicates whether a transform coefficient in the first transform coefficient set belongs to the first group of transform coefficients.

Step 140. Determine an image difference between the first image and the second image according to the first group of transform coefficients and the second transform coefficient set.

When a second transform coefficient set is a transform coefficient set that is obtained by transforming the second image, step 140 may include selecting a second group of transform coefficients from the second transform coefficient set according to the first group of transform coefficients and a one-to-one correspondence between transform coefficients in the first transform coefficient set and in the second transform coefficient set; and determining the image difference between the first image and the second image according to differences between the first group of transform coefficients and the second group of transform coefficients. When a second transform coefficient is a transform coefficient set that is obtained by transforming the difference image between the first image and the second image, step 140 may include selecting a second group of transform coefficients from the second transform coefficient set according to the first group of transform coefficients and a one-to-one correspondence between transform coefficients in the first transform coefficient set and in the second transform coefficient set; and determining the image difference between the first image and the second image according to the second group of transform coefficients.

Step 150. Process the first image and the second image according to the image difference.

The processing may include at least one of the following. (1) determining an image difference between the first image and each image in K second images; determining weighting coefficients according to K image differences, where the weighting coefficients are a decreasing function of the image differences; and performing filtering processing on the first image and the K second images according to the weighting coefficients, to obtain a filtered image; (2) determining an image difference between the first image and each image in K second images; and using G second images with minimum image differences in K image differences as nearest neighbor images of the first image; (3) determining an image difference between the first image and each image in K second images; determining weighting coefficients according to K image differences, where the weighting coefficients are a decreasing function of the image differences; and performing weighted average on neighbor images of the K second images according to the weighting coefficients, to obtain a predicted image of a neighbor image of the first image; (4) determining an image difference between the first image and each image in K second images; determining weighting coefficients according to K image differences, where the weighting coefficients are a decreasing function of the image differences; and performing filtering processing on the first image and the K second images according to the weighting coefficients, to obtain a filtered image, and using the filtered image as a decoded reconstructed image of an image region in which the first image is located; or (5) determining an image difference between the first image and each image in S second images; using E second images with minimum image differences in S image differences as nearest neighbor images of the first image; performing weighted average on the E second images or selecting an image with a minimum image difference in the second images, to obtain a predicted image of the first image; and performing coding processing on the first image according to the predicted image.

In this embodiment of the present disclosure, a transform coefficient with a magnitude meeting a preset threshold condition can better reflect main structure information of an image, and an image difference determined by using the transform coefficient with the magnitude meeting the preset threshold condition can well reflect a difference degree between images, so that subsequent image processing based on the image difference is more accurate.

Optionally, in an embodiment, when the second transform coefficient set is a transform coefficient set that is obtained by transforming the second image, step 140 may include selecting, from the second transform coefficient set according to a one-to-one correspondence between transform coefficients in the first transform coefficient set and in the second transform coefficient set, a second group of transform coefficients that is corresponding to the first group of transform coefficients; and determining the image difference according to the first group of transform coefficients and the second group of transform coefficients.

Optionally, in an embodiment, the determining the image difference according to the first group of transform coefficients and the second group of transform coefficients may include determining differences between corresponding transform coefficients in the first group of transform coefficients and in the second group of transform coefficients; and determining a sum of the differences between the corresponding transform coefficients as the image difference.

Optionally, in an embodiment, both the first group of transform coefficients and the second group of transform coefficients are divided into N subgroups in a same manner; and the determining the image difference according to the first group of transform coefficients and the second group of transform coefficients may include determining N target values, where an $i^{th}$ target value in the N target values is a sum of differences between corresponding transform coefficients in an $i^{th}$ subgroup of the first group of transform coefficients and in an $i^{th}$ subgroup of the second group of transform coefficients; and performing weighted summation on the N target values according to weighting coefficients of the N subgroups, to obtain the image difference.

It should be understood that the weighting coefficient (weight) is a real number, and usually is a positive real number. A weighting coefficient of a subgroup may be determined according to locations, of transform coefficients in the subgroup, in a transform coefficient set. For example, when DCT or DST transform is performed on the first image, all transform coefficients are indexed according to a common zigzag scanning sequence, salient transform coefficients (that is, transform coefficients with magnitudes of the transform coefficients meeting the preset threshold condition) with indexes less than one-half of a total index value in the first transform coefficient set are added to a subgroup 1, and a weighting coefficient of the subgroup 1 is 0.75; and remaining salient transform coefficients in the first transform coefficient set are added to a subgroup 2, and a weighting coefficient of the subgroup 2 is 0.25. For another example, when DCT or DST transform is performed on the first image and the first image is rectangular, salient transform coefficients that are located in a one-fourth region at an upper left corner of a transform coefficient matrix and that are in the first transform coefficient set are added to a subgroup 1, and a weighting coefficient of the subgroup 1 is 1.2; salient transform coefficients that are located in a one-fourth region at an upper right corner and a one-fourth region at a lower left corner of the transform coefficient matrix and that are in the first transform coefficient set are added to a subgroup 2, and a weighting coefficient of the subgroup 2 is 0.8; and salient transform coefficients that are located in a one-fourth region at a lower right corner of the transform coefficient matrix and that are in the first transform coefficient set are added to a subgroup 3, and a weighting coefficient of the subgroup 3 is 0.25.

Optionally, in an embodiment, determining the image difference according to the first group of transform coefficients and the second group of transform coefficients may include determining a first target value, where the first target value is a sum of differences between corresponding transform coefficients in the first group of transform coefficients and in the second group of transform coefficients; determining a second target value, where the second target value is a sum of differences between corresponding transform coefficients in remaining transform coefficients other than the first group of transform coefficients in the first transform coefficient set and in remaining transform coefficients other than the second group of transform coefficients in the second transform coefficient set; and performing weighted summation on the first target value and the second target value according to a weighting coefficient of the first target value and a weighting coefficient of the second target value, to obtain the image difference.

The weighting coefficient of the first target value may be a positive real number, for example, may be 1, 0.5, or 2; and the weighting coefficient of the second target value may be a non-zero real number, for example, may be −0.2, 0.5, or 0.8. The weighting coefficient of the first target value and the weighting coefficient of the second target value may be unequal, and usually, the weighting coefficient of the first target value is greater than the weighting coefficient of the second target value.

It should be understood that the above-mentioned sum of differences may be one of a MSE, a MAD, a SSE, or a SAD, and another summation calculation method may also be used. For example, when the sum of differences is a SSE, the corresponding transform coefficients in the two groups of transform coefficients are subtracted from one another to obtain a group of differences, and squares of the differences are added up to obtain the SSE. For another example, when the sum of differences is a MAD, the corresponding transform coefficients in the two groups of transform coefficients are subtracted from one another to obtain a group of differences, absolute values of the differences are added up to obtain a sum of the absolute difference, and then, the sum of the absolute difference is divided by a quantity of the differences to perform normalization, to obtain the MAD.

Optionally, in an embodiment, when the second transform coefficient set is a transform coefficient set that is obtained by transforming the difference image between the first image and the second image, step 140 may include selecting, from the second transform coefficient set according to a one-to-one correspondence between transform coefficients in the first transform coefficient set and in the second transform coefficient set, a second group of transform coefficients that is corresponding to the first group of transform coefficients; and determining the image difference according to the second group of transform coefficients.

Optionally, in an embodiment, the determining the image difference according to the second group of transform coefficients includes determining a sum of transform coefficients in the second group of transform coefficients as the image difference.

Optionally, in an embodiment, the second group of transform coefficients includes N subgroups, and the determining the image difference according to the second group of transform coefficients may include determining N target values, where an $i^{th}$ target value is a sum of transform coefficients in an $i^{th}$ subgroup; and performing weighted summation on the N target values according to weighting coefficients of the N target values, to obtain the image difference.

Optionally, in an embodiment, the determining the image difference according to the second group of transform coefficients may include determining a first target value, where the first target value is a sum of transform coefficients in the second group of transform coefficients; determining a second target value, where the second target value is a sum of remaining transform coefficients other than the second group of transform coefficients in the second transform coefficient set; and performing weighted summation on the first target value and the second target value according to a weighting coefficient of the first target value and a weighting coefficient of the second target value, to obtain the image difference.

A weighting coefficient of a first target value sum may be a positive real number, for example, 1, 0.5, or 2; and a weighting coefficient of a second target value sum may be a non-zero real number, for example, −0.2, 0.5, 0.8, or 0.9. The weighting coefficient of the first target value sum and the weighting coefficient of the second target value sum may be unequal, and usually, the weighting coefficient of the first target value sum is greater than the weighting coefficient of the second target value sum.

It should be noted that the sum of transform coefficients may be one of a sum of absolute values, a sum of squared values, a mean value of squared values, a mean value of absolute values, or a root mean squared error (RMSE), and another calculation manner may also be used. For example, when the sum of transform coefficients is a sum of absolute values, absolute values of the transform coefficients are added up, to obtain the sum of absolute values. For another example, when the sum of transform coefficients is a mean value of squared values, squared values of the transform coefficients are added up, to obtain a sum of the squared values, and then, the sum of the squared values is divided by a quantity of the transform coefficients to perform normalization, to obtain the mean value of squared values.

Multiple manners of subsequent processing by using the image difference are described below in detail with reference to specific embodiments.

Optionally, in an embodiment, the first image is a target image, the second image is any candidate image in K candidate images; and step 150 may include determining a weighting coefficient of each candidate image according to an image difference between the target image and each candidate image; and determining a filtered image of the target image according to pixel values of the K candidate images and weighting coefficients of the K candidate images.

Visual quality of the filtered image is higher than that of the target image, and the target image is replaced with the filtered image, so that visual quality of an image in which the target image is located can be enhanced.

Any candidate image in the K candidate images may be in a same shape and size with the target image. The target image may be a region in an image, for example, an image of a preset shape in a decoded image, where the preset shape is, for example, a rectangle or a triangle. In addition, there is an image difference between the target image and each candidate image in the K candidate images, and the image difference between the target image and each candidate image may be determined in manners described in the foregoing embodiments.

The pixel value may be one of color space components of pixels. In this case, the pixel value is a scalar. The pixel value may alternatively be a multi-dimensional vector formed by multiple components in color space components of pixels. Pixel color space is, for example, common color space such as: red, green, blue (RGB) color space; luma and chroma component (YCbCr) color space; luminance and chrominance (YUV) color space; hue, saturation, and value (HSV) color space ; or International Commission on Illumination lightness, green-red and blue-yellow (CIE Lab) color space.

The determining a weighting coefficient of each candidate image according to an image difference between the target image and each candidate image may be implemented in multiple manners, and several implementations are described below.

For example, the weighting coefficient of each candidate image is determined according to $Wk=b1^{(-(Dk)^{a1}/h1)}$, where each of b1, a1, and h1 represents a positive real number, Dk represents an image difference between the target image and a $k^{th}$ candidate image, and Wk represents a weighting coefficient of the $k^{th}$ candidate image.

For another example, the weighting coefficient of each candidate image is determined according to $Wk=b2-(Dk)^{a2}/h2$, where each of b2, a2, and h2 represents a positive real number, Dk represents an image difference between the target image and a $k^{th}$ candidate image, and Wk represents a weighting coefficient of the $k^{th}$ candidate image.

For another example, the weighting coefficient of each candidate image is determined according to $$Wk = \frac{h3}{b3 + (Dk)^{a3}},$$

where each of b3, a3, and h3 represents a positive real number, Dk represents an image difference between the target image and a $k^{th}$ candidate image, and Wk represents a weighting coefficient of the $k^{th}$ candidate image.

In addition, the determining a filtered image of the target image according to pixel values of the K candidate images and weighting coefficients of the K candidate images may also be implemented in multiple manners. For example, the filtered image of the target image may be determined according to $$Pf_j = \frac{W0 \times P0_j + \sum_{k=1}^{K} Wk \times Pk_j}{W0 + \sum_{k=1}^{K} Wk},$$

where $Pf_j$ represents a pixel value of the filtered image at a $j^{th}$ pixel point, W0 represents a weighting coefficient of the target image, Wk represents a weighting coefficient of a $k^{th}$ candidate image, $P0_j$ represents a pixel value of the target image at a $j^{th}$ pixel point, and $Pk_j$ represents a pixel value of the $k^{th}$ candidate image at a $j^{th}$ pixel point.

Optionally, in an embodiment, the first image is a target image, the second image is any candidate image in K candidate images; and the performing subsequent image processing on the first image and the second image according to the image difference includes selecting, from the K candidate images according to image differences between the target image and the K candidate images, G candidate images with minimum image differences in the image differences between the target image and the K candidate images as nearest neighbor images of the target image, where G is less than or equal to K.

This embodiment may be considered as an image nearest neighbor (nearest neighbor) searching method. The target image may be an image region in an image, for example, an image of a preset shape in a decoded image, or the target image may be a predicted image of a decoding prediction unit, for example, a predicted image obtained by means of motion vector-based inter-frame prediction in H.265. The preset shape is, for example, a rectangle or a triangle. The K candidate images may be images in a reconstructed region of a current decoding image, or images in another decoded image, or images in a decoder side knowledge base.

It should be understood that there is an image difference between the target image and each candidate image in the K candidate images, and the image difference between the target image and each candidate image may be determined in an image difference determining manner in any of the foregoing embodiments.

It should be understood that G images with minimum image differences are found as the nearest neighbor images of the target image, where G is a positive integer. For example, G=1, 2, 4, 6, or 8.

It should be noted that the nearest neighbor images may be used to enhance the target image by, for example, replacing the target image with a nearest neighbor image with a minimum image difference, or by, for example, using the nearest neighbor images to filter the target image, and compositing the G nearest neighbor images and the target image into a filtered image, to replace a target image P0. The nearest neighbor images may further be used to indicate a start location of iterative search. For example, a nearest neighbor image is first found from several images around a start search point, and then next iterative search is performed by using the nearest neighbor image as a new start search point.

Optionally, in an embodiment, the first image is a target template image corresponding to a prediction block, where the prediction block corresponds to K candidate blocks, and the K candidate blocks respectively correspond to K candidate template images, the second image is any residual template image in K residual template images that are obtained by performing subtraction between corresponding pixel points in each of the K candidate template images and in the target template image, and the performing subsequent image processing on the first image and the second image according to the image difference includes selecting, from the K residual template images according to image differences between the target template image and the K residual template images, G residual template images with minimum image differences in the image differences between the target template image and the K residual template images, where G is less than or equal to K; selecting, from the K candidate blocks, G candidate blocks corresponding to the G residual template images; and determining a predicted pixel value of the prediction block according to pixel values of the G candidate blocks. It should be noted that, alternatively, the first image may be a target template image corresponding to a prediction block, and a second image is any residual template image in K residual template images that are obtained by performing subtraction between corresponding pixel points in each of K candidate template images and in the target template image.

Figure 2:
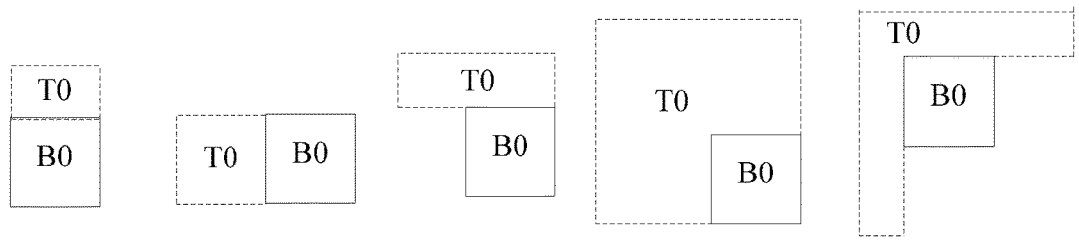
FIG. 2 is a diagram of examples of location relationships between a prediction block and a target template image.

This embodiment may be considered as a template matching prediction method. The prediction block is usually a rectangular region, and may be in a same shape and size with any candidate block. The target template image may be in a same shape and size with any candidate template image. A region formed by the prediction block and the target template image may be in a same shape and size with a region formed by any pair of candidate block and candidate template image. The target template image may be adjacent to the prediction block, and is usually a rectangular region or an L-shaped region, or in another shape. FIG. 2 shows several examples of a target template image T0 of a prediction block B0.

In addition, the candidate template images may be images in a decoder side knowledge base, or images in a reconstructed region of a current decoding image, or images in another decoded image.

Candidate blocks Bg (g=1, 2, . . . , G) corresponding to G candidate template images with minimum image differences are found as nearest neighbor images of the prediction block B0, where G is a positive integer, and G≤K. For example, G=1, 2, 4, 6, or 8.

The determining a predicted pixel value of the prediction block according to pixel values of the G candidate blocks may include determining the predicted pixel value of the prediction block according to $$B0_j = \frac{\sum_{g=1}^{G} Wg \cdot Bg_j}{\sum_{g=1}^{G} Wg},$$

where $B0_j$ represents a pixel value of the prediction block at a $j^{th}$ pixel point, $Bg_j$ represents a pixel value of a $g^{th}$ candidate block at a $j^{th}$ pixel point, and Wg represents a weighting coefficient corresponding to the $g^{th}$ candidate block.

The weighting coefficient Wg corresponding to the candidate block may be determined according to an image difference Dg between a candidate template image of the candidate block and the target template image. For example, the weighting coefficient Wg decreases with an increase of Dg. Weighting coefficients corresponding to the G candidate blocks may be determined according to $Wg=b1^{(-(Dg)^{a1}/h1)}$, where each of b1, a1, and h1 represents a positive real number, Dg represents an image difference between the target template image and a $g^{th}$ candidate template image, and Wg represents a weighting coefficient corresponding to a $g^{th}$ candidate block.

For another example, a weighting coefficient of each candidate block in the G candidate template images is determined according to $Wg=b2-(Dg)^{a2}/h2$, where each of b2, a2, and h2 represents a positive real number, Dg represents an image difference between the target image and a $g^{th}$ candidate template image, and Wg represents a weighting coefficient of the $g^{th}$ candidate template image.

For another example, a weighting coefficient of each candidate image in the G candidate template images is determined according to $$Wg = \frac{h3}{b3 + (Dg)^{a3}},$$

where each of b3, a3, and h3 represents a positive real number, Dg represents an image difference between the target image and a $g^{th}$ candidate template image, and Wg represents a weighting coefficient of the $g^{th}$ candidate template image.

Figure 3:
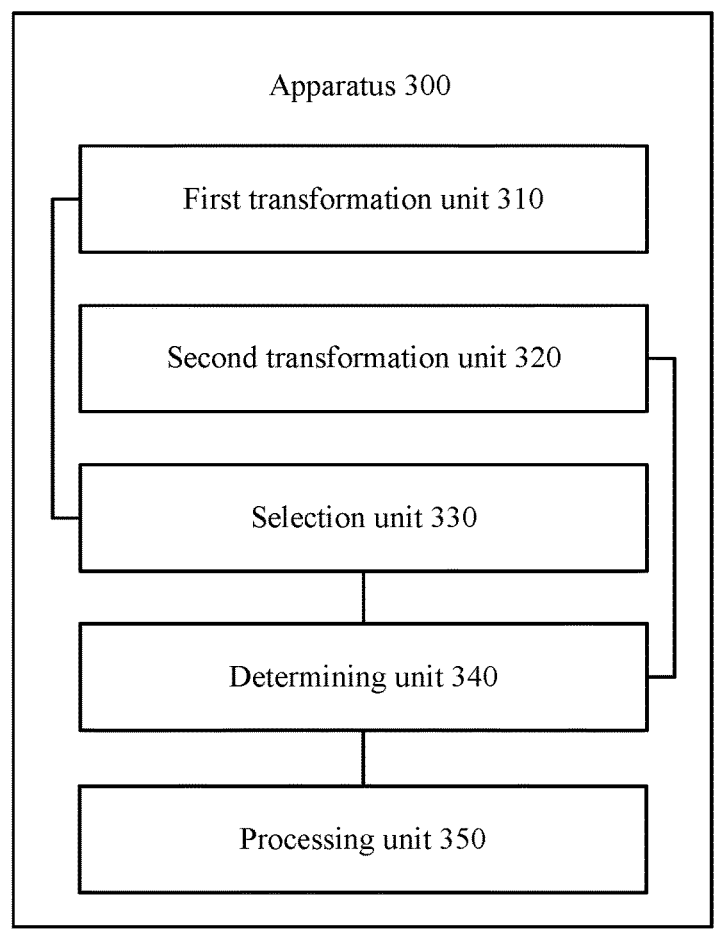
FIG. 3 is a schematic block diagram of an image processing apparatus according to an embodiment of the present disclosure.
Figure 4:
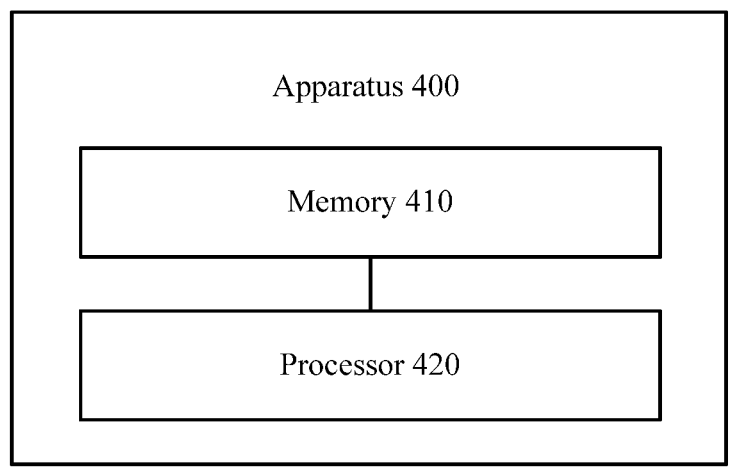
FIG. 4 is a schematic block diagram of an image processing apparatus according to an embodiment of the present disclosure.

The foregoing describes in detail the image processing method according to the embodiment of the present disclosure with reference to FIG. 1 and FIG. 2, and the following describes image processing apparatuses according to embodiments of the present disclosure with reference to FIG. 3 and FIG. 4.

It should be understood that the image processing apparatuses described in FIG. 3 and FIG. 4 may implement the steps of the image processing method described in FIG. 1. For brevity, repeated descriptions are omitted as appropriate.

FIG. 3 is a schematic block diagram of an image processing apparatus according to an embodiment of the present disclosure. The apparatus 300 in FIG. 3 includes a first transformation unit 310 configured to transform a first image to obtain a first transform coefficient set; a second transformation unit 320 configured to transform a second image in a same manner, or transform a difference image between the first image and a second image in a same manner, to obtain a second transform coefficient set; a selection unit 330 configured to select a first group of transform coefficients from the first transform coefficient set according to magnitudes of transform coefficients in the first transform coefficient set that is obtained by the first transformation unit 310, where magnitudes of transform coefficients in the first group of transform coefficients meet a preset threshold condition; a determining unit 340 configured to determine an image difference between the first image and the second image according to the first group of transform coefficients selected by the selection unit 330 and the second transform coefficient set obtained by the second transformation unit 320; and a processing unit 350 configured to process the first image and the second image according to the image difference determined by the determining unit 340.

In this embodiment of the present disclosure, a transform coefficient with a magnitude meeting a preset threshold condition can better reflect main structure information of an image, and an image difference determined by using the transform coefficient with the magnitude meeting the preset threshold condition can well reflect a difference degree between images, so that subsequent image processing based on the image difference is more accurate.

Optionally, in an embodiment, when the second transform coefficient set is a transform coefficient set that is obtained by transforming the second image in the same manner, the determining unit 340 is configured to select, from the second transform coefficient set according to a one-to-one correspondence between transform coefficients in the first transform coefficient set and in the second transform coefficient set, a second group of transform coefficients that is corresponding to the first group of transform coefficients; and determine the image difference according to the first group of transform coefficients and the second group of transform coefficients.

Optionally, in an embodiment, the determining unit 340 is configured to determine differences between corresponding transform coefficients in the first group of transform coefficients and in the second group of transform coefficients; and determine a sum of the differences between the corresponding transform coefficients as the image difference.

Optionally, in an embodiment, both the first group of transform coefficients and the second group of transform coefficients are divided into N subgroups in a same manner; and the determining unit 340 is configured to determine N target values, where an $i^{th}$ target value in the N target values is a sum of differences between corresponding transform coefficients in an $i^{th}$ subgroup of the first group of transform coefficients and in an $i^{th}$ subgroup of the second group of transform coefficients; and perform weighted summation on the N target values according to weighting coefficients of the N subgroups, to obtain the image difference.

Optionally, in an embodiment, the determining unit 340 is configured to determine a first target value, where the first target value is a sum of differences between corresponding transform coefficients in the first group of transform coefficients and in the second group of transform coefficients; determine a second target value, where the second target value is a sum of differences between corresponding transform coefficients in remaining transform coefficients other than the first group of transform coefficients in the first transform coefficient set and in remaining transform coefficients other than the second group of transform coefficients in the second transform coefficient set; and perform weighted summation on the first target value and the second target value according to a weighting coefficient of the first target value and a weighting coefficient of the second target value, to obtain the image difference.

Optionally, in an embodiment, when the second transform coefficient set is a transform coefficient set that is obtained by transforming the difference image between the first image and the second image in the same manner, the determining unit 340 is configured to select, from the second transform coefficient set according to a one-to-one correspondence between transform coefficients in the first transform coefficient set and in the second transform coefficient set, a second group of transform coefficients that is corresponding to the first group of transform coefficients; and determine the image difference according to the second group of transform coefficients.

Optionally, in an embodiment, the determining unit 340 is configured to determine a sum of transform coefficients in the second group of transform coefficients as the image difference.

Optionally, in an embodiment, the second group of transform coefficients includes N subgroups, and the determining unit 340 is configured to determine N target values, where an $i^{th}$ target value is a sum of transform coefficients in an $i^{th}$ subgroup; and perform weighted summation on the N target values according to weighting coefficients of the N target values, to obtain the image difference.

Optionally, in an embodiment, the determining unit 340 is configured to determine a first target value, where the first target value is a sum of transform coefficients in the second group of transform coefficients; determine a second target value, where the second target value is a sum of remaining transform coefficients other than the second group of transform coefficients in the second transform coefficient set; and perform weighted summation on the first target value and the second target value according to a weighting coefficient of the first target value and a weighting coefficient of the second target value, to obtain the image difference.

Optionally, in an embodiment, the first image is a target image, the second image is any candidate image in K candidate images; and the processing unit 350 is configured to determine a weighting coefficient of each candidate image according to an image difference between the target image and each candidate image; and determine a filtered image of the target image according to pixel values of the K candidate images and weighting coefficients of the K candidate images.

Optionally, in an embodiment, the determining unit 340 is configured to determine the weighting coefficient of each candidate image according to $Wk=b1^{(-(Dk)^{a1}/h1)}$, where each of b1, a1, and h1 represents a positive real number, Dk represents an image difference between the first image and a $k^{th}$ candidate image, and Wk represents a weighting coefficient of the $k^{th}$ candidate image.

Optionally, in an embodiment, the determining unit 340 is configured to determine the weighting coefficient of each candidate image according to $Wk=b2-(Dk)^{a2}/h2$, where each of b2, a2, and h2 represents a positive real number, Dk represents an image difference between the first image and a $k^{th}$ candidate image, and Wk represents a weighting coefficient of the $k^{th}$ candidate image.

Optionally, in an embodiment, the determining unit 340 is configured to determine the weighting coefficient of each candidate image according to $$Wk = \frac{h3}{b3 + (Dk)^{a3}},$$

where each of b3, a3, and h3 represents a positive real number, Dk represents an image difference between the first image and a $k^{th}$ candidate image, and Wk represents a weighting coefficient of the $k^{th}$ candidate image.

Optionally, in an embodiment, the processing unit 350 is configured to determine the filtered image according to $$Pf_j = \frac{W0 \times P0_j + \sum_{k=1}^{K} Wk \times Pk_j}{W0 + \sum_{k=1}^{K} Wk},$$

where $Pf_j$ represents a pixel value of the filtered image at a $j^{th}$ pixel point, W0 represents a weighting coefficient of the first image, Wk represents a weighting coefficient of a $k^{th}$ candidate image, $P0_j$ represents a pixel value of the first image at a $j^{th}$ pixel point, and $Pk_j$ represents a pixel value of the $k^{th}$ candidate image at a $j^{th}$ pixel point.

FIG. 4 is a schematic block diagram of an image processing apparatus according to an embodiment of the present disclosure. The apparatus 400 in FIG. 4 includes a memory 410 configured to store a program; and a processor 420 configured to execute the program, where when the program is being executed, the processor 420 is configured to transform a first image to obtain a first transform coefficient set; transform a second image in a same manner, or transform a difference image between the first image and a second image in a same manner, to obtain a second transform coefficient set; select a first group of transform coefficients from the first transform coefficient set according to magnitudes of transform coefficients in the first transform coefficient set, where magnitudes of transform coefficients in the first group of transform coefficients meet a preset threshold condition; determine an image difference between the first image and the second image according to the first group of transform coefficients and the second transform coefficient set; and process the first image and the second image according to the image difference.

In this embodiment of the present disclosure, a transform coefficient with a magnitude meeting a preset threshold condition can better reflect main structure information of an image, and an image difference determined by using the transform coefficient with the magnitude meeting the preset threshold condition can well reflect a difference degree between images, so that subsequent image processing based on the image difference is more accurate.

Optionally, in an embodiment, when the second transform coefficient set is a transform coefficient set that is obtained by transforming the second image in the same manner, the processor 420 is configured to select, from the second transform coefficient set according to a one-to-one correspondence between transform coefficients in the first transform coefficient set and in the second transform coefficient set, a second group of transform coefficients that is corresponding to the first group of transform coefficients; and determine the image difference according to the first group of transform coefficients and the second group of transform coefficients.

Optionally, in an embodiment, the processor 420 is configured to determine differences between corresponding transform coefficients in the first group of transform coefficients and in the second group of transform coefficients; and determine a sum of the differences between the corresponding transform coefficients as the image difference.

Optionally, in an embodiment, both the first group of transform coefficients and the second group of transform coefficients are divided into N subgroups in a same manner; and the processor 420 is configured to determine N target values, where an $i^{th}$ target value in the N target values is a sum of differences between corresponding transform coefficients in an $i^{th}$ subgroup of the first group of transform coefficients and in an $i^{th}$ subgroup of the second group of transform coefficients; and perform weighted summation on the N target values according to weighting coefficients of the N subgroups, to obtain the image difference.

Optionally, in an embodiment, the processor 420 is configured to determine a first target value, where the first target value is a sum of differences between corresponding transform coefficients in the first group of transform coefficients and in the second group of transform coefficients; determine a second target value, where the second target value is a sum of differences between corresponding transform coefficients in remaining transform coefficients other than the first group of transform coefficients in the first transform coefficient set and in remaining transform coefficients other than the second group of transform coefficients in the second transform coefficient set; and perform weighted summation on the first target value and the second target value according to a weighting coefficient of the first target value and a weighting coefficient of the second target value, to obtain the image difference.

Optionally, in an embodiment, when the second transform coefficient set is a transform coefficient set that is obtained by transforming the difference image between the first image and the second image in the same manner, the processor 420 is configured to select, from the second transform coefficient set according to a one-to-one correspondence between transform coefficients in the first transform coefficient set and in the second transform coefficient set, a second group of transform coefficients that is corresponding to the first group of transform coefficients; and determine the image difference according to the second group of transform coefficients.

Optionally, in an embodiment, the processor 420 is configured to determine a sum of transform coefficients in the second group of transform coefficients as the image difference.

Optionally, in an embodiment, the second group of transform coefficients includes N subgroups, and the processor 420 is configured to determine N target values, where an $i^{th}$ target value is a sum of transform coefficients in an $i^{th}$ subgroup; and perform weighted summation on the N target values according to weighting coefficients of the N target values, to obtain the image difference.

Optionally, in an embodiment, the processor 420 is configured to determine a first target value, where the first target value is a sum of transform coefficients in the second group of transform coefficients; determine a second target value, where the second target value is a sum of remaining transform coefficients other than the second group of transform coefficients in the second transform coefficient set; and perform weighted summation on the first target value and the second target value according to a weighting coefficient of the first target value and a weighting coefficient of the second target value, to obtain the image difference.

Optionally, in an embodiment, the first image is a target image, the second image is any candidate image in K candidate images; and the processor 420 is configured to determine a weighting coefficient of each candidate image according to an image difference between the target image and each candidate image; and determine a filtered image of the target image according to pixel values of the K candidate images and weighting coefficients of the K candidate images.

Optionally, in an embodiment, the processor 420 is configured to determine the weighting coefficient of each candidate image according to $Wk = b1^{(-(Dk)^{a1}/h1)}$, where each of b1, a1, and h1 represents a positive real number, Dk represents an image difference between the first image and a $k^{th}$ candidate image, and Wk represents a weighting coefficient of the $k^{th}$ candidate image.

Optionally, in an embodiment, the processor 420 is configured to determine the weighting coefficient of each candidate image according to $Wk = b2 - (Dk)^{a2}/h2$, where each of b2, a2, and h2 represents a positive real number, Dk represents an image difference between the first image and a $k^{th}$ candidate image, and Wk represents a weighting coefficient of the $k^{th}$ candidate image.

Optionally, in an embodiment, the processor 420 is configured to determine the weighting coefficient of each candidate image according to $$Wk = \frac{h3}{b3 + (Dk)^{a3}},$$

where each of b3, a3, and h3 represents a positive real number, Dk represents an image difference between the first image and a $k^{th}$ candidate image, and Wk represents a weighting coefficient of the $k^{th}$ candidate image.

Optionally, in an embodiment, the processor 420 is configured to determine the filtered image according to $$Pf_j = \frac{W0 \times P0_j + \sum_{k=1}^{K} Wk \times Pk_j}{W0 + \sum_{k=1}^{K} Wk},$$

where $Pf_j$ represents a pixel value of the filtered image at a $j^{th}$ pixel point, W0 represents a weighting coefficient of the first image, Wk represents a weighting coefficient of a $k^{th}$ candidate image, $P0_j$ represents a pixel value of the first image at a $j^{th}$ pixel point, and $Pk_j$ represents a pixel value of the $k^{th}$ candidate image at a $j^{th}$ pixel point.

It should be understood that the term "and/or" in the embodiments of the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that the units and algorithm steps in the examples described with reference to the embodiments disclosed in this specification may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely used as an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An image processing method, comprising:
transforming a first image in a first manner to obtain a first transform coefficient set;
transforming a second image in the same manner to obtain a second transform coefficient set, or transforming a difference image between the first image and a second image in the same manner to obtain the second transform coefficient set;
selecting a first group of transform coefficients from the first transform coefficient set according to magnitudes of transform coefficients in the first transform coefficient set, wherein magnitudes of transform coefficients in the first group of transform coefficients meet a preset threshold condition;
determining an image difference between the first image and the second image according to the first group of transform coefficients and the second transform coefficient set; and
processing the first image and the second image according to the image difference.

2. The method according to claim 1, wherein determining the image difference between the first image and the second image when the second transform coefficient set is obtained by transforming the second image with the transform comprises:
   selecting, from the second transform coefficient set according to a one-to-one correspondence between transform coefficients in the first transform coefficient set and in the second transform coefficient set, a second group of transform coefficients that corresponds to the first group of transform coefficients; and
   determining the image difference according to the first group of transform coefficients and the second group of transform coefficients.

3. The method according to claim 2, wherein determining the image difference according to the first group of transform coefficients and the second group of transform coefficients comprises:
   determining differences between corresponding transform coefficients in the first group of transform coefficients and in the second group of transform coefficients; and
   determining a sum of the differences between the corresponding transform coefficients as the image difference.

4. The method according to claim 2, wherein both the first group of transform coefficients and the second group of transform coefficients are divided into N subgroups in a same manner, wherein N is an integer, and wherein determining the image difference according to the first group of transform coefficients and the second group of transform coefficients comprises:
   determining N target values, wherein an $i^{th}$ target value in the N target values is a sum of differences between corresponding transform coefficients in an $i^{th}$ subgroup of the first group of transform coefficients and in an $i^{th}$ subgroup of the second group of transform coefficients; and
   performing weighted summation on the N target values according to weighting coefficients of the N subgroups to obtain the image difference.

5. The method according to claim 2, wherein determining the image difference according to the first group of transform coefficients and the second group of transform coefficients comprises:
   determining a first target value, wherein the first target value is a sum of differences between corresponding transform coefficients in the first group of transform coefficients and in the second group of transform coefficients;
   determining a second target value, wherein the second target value is a sum of differences between corresponding transform coefficients in a first remaining group of transform coefficients other than the first group of transform coefficients in the first transform coefficient set and in a second remaining group of transform coefficients other than the second group of transform coefficients in the second transform coefficient set; and
   performing weighted summation on the first target value and the second target value according to a weighting coefficient of the first target value and a weighting coefficient of the second target value to obtain the image difference.

6. The method according to claim 1, wherein determining the image difference between the first image and the second image when the second transform coefficient set is a transform coefficient set that is obtained by transforming the difference image between the first image and the second image in the same manner, comprises:
   selecting, from the second transform coefficient set according to a one-to-one correspondence between transform coefficients in the first transform coefficient set and in the second transform coefficient set, a second group of transform coefficients that corresponds to the first group of transform coefficients; and
   determining the image difference according to the second group of transform coefficients.

7. The method according to claim 6, wherein determining the image difference according to the second group of transform coefficients comprises determining a sum of transform coefficients in the second group of transform coefficients as the image difference.

8. The method according to claim 6, wherein the second group of transform coefficients comprises N subgroups, wherein N is an integer, and wherein determining the image difference according to the second group of transform coefficients comprises:
   determining N target values, wherein an $i^{th}$ target value is a sum of transform coefficients in an $i^{th}$ subgroup; and
   performing weighted summation on the N target values according to weighting coefficients of the N target values, to obtain the image difference.

9. The method according to claim 6, wherein the determining the image difference according to the second group of transform coefficients comprises:
   determining a first target value, wherein the first target value is a sum of transform coefficients in the second group of transform coefficients;
   determining a second target value, wherein the second target value is a sum of the second remaining group of transform coefficients other than the second group of transform coefficients in the second transform coefficient set; and
   performing weighted summation on the first target value and the second target value according to a weighting coefficient of the first target value and a weighting coefficient of the second target value, to obtain the image difference.

10. The method according to claim 1, wherein the first image is a target image and the second image is any candidate image in K candidate images, wherein K is an integer, and wherein processing the first image and the second image according to the image difference comprises:
   determining a weighting coefficient of each candidate image according to an image difference between the target image and each candidate image; and
   determining a filtered image of the target image according to pixel values of the K candidate images and weighting coefficients of the K candidate images.

11. The method according to claim 10, wherein determining the weighting coefficient of each candidate image according to the image difference between the target image and each of the candidate images comprises determining the weighting coefficient of each of the candidate images according to $Wk=b1^{(-(Dk)^{a1}/h1)}$, wherein each of b1, a1, and h1 represents a positive real number, Dk represents an image difference between the first image and a $k^{th}$ candidate image, and Wk represents a weighting coefficient of the $k^{th}$ candidate image.

12. The method according to claim 10, wherein determining the weighting coefficient of each candidate image according to the image difference between the target image and each candidate image comprises determining the weighting coefficient of each candidate image according to $Wk=b2-(Dk)^{a2}/h2$, wherein each of b2, a2, and h2 represents a positive real number, Dk represents an image difference between the first image and a $k^{th}$ candidate image, and Wk represents a weighting coefficient of the $k^{th}$ candidate image.

13. The method according to claim 10, wherein determining the weighting coefficient of each candidate image according to the image difference between the target image and each candidate image comprises determining the weighting coefficient of each candidate image according to $$Wk = \frac{h3}{b3+(Dk)^{a3}},$$

wherein each of b3, a3, and h3 represents a positive real number, Dk represents an image difference between the first image and a $k^{th}$ candidate image, and Wk represents a weighting coefficient of the $k^{th}$ candidate image.

14. The method according to claim 10, wherein determining the filtered image of the target image according to pixel values of the K candidate images and weighting coefficients of the K candidate images comprises determining the filtered image according to $$Pf_j = \frac{W0 \times P0_j + \sum_{k=1}^{K} Wk \times Pk_j}{W0 + \sum_{k=1}^{K} Wk},$$

wherein $Pf_j$ represents a pixel value of the filtered image at a $j^{th}$ pixel point, W0 represents a weighting coefficient of the first image, Wk represents a weighting coefficient of a $k^{th}$ candidate image, $P0_j$ represents a pixel value of the first image at a $j^{th}$ pixel point, and $Pk_j$ represents a pixel value of the $k^{th}$ candidate image at a $j^{th}$ pixel point.

15. An image processing apparatus, comprising:
a processor;
a first transformer coupled to the processor and configured to transform a first image in a first manner to obtain a first transform coefficient set;
a second transformer coupled to the processor and configured to transform a second image in the same manner or transform a difference image between the first image and a second image in the same manner to obtain a second transform coefficient set;
a selector coupled to the processor and configured to select a first group of transform coefficients from the first transform coefficient set according to magnitudes of transform coefficients in the first transform coefficient set that is obtained by the first transformer, wherein magnitudes of transform coefficients in the first group of transform coefficients meet a preset threshold condition;
a determiner coupled to the processor and configured to determine an image difference between the first image and the second image according to the first group of transform coefficients selected by the selector and the second transform coefficient set obtained by the second transformer; and
the processor configured to process the first image and the second image according to the image difference determined by the determiner.

16. The apparatus according to claim 15, wherein the determiner is further configured to:

select, from the second transform coefficient set according to a one-to-one correspondence between transform coefficients in the first transform coefficient set and in the second transform coefficient set, a second group of transform coefficients that corresponds to the first group of transform coefficients; and
determine the image difference according to the first group of transform coefficients and the second group of transform coefficients.

17. The apparatus according to claim 16, wherein the determiner is further configured to:
determine differences between corresponding transform coefficients in the first group of transform coefficients and in the second group of transform coefficients; and
determine a sum of the differences between the corresponding transform coefficients as the image difference.

18. The apparatus according to claim 16, wherein both the first group of transform coefficients and the second group of transform coefficients are divided into N subgroups in a same manner, wherein N is an integer, and wherein the determiner is further configured to:
determine N target values, wherein an $i^{th}$ target value in the N target values is a sum of differences between corresponding transform coefficients in an $i^{th}$ subgroup of the first group of transform coefficients and in an $i^{th}$ subgroup of the second group of transform coefficients; and
perform weighted summation on the N target values according to weighting coefficients of the N subgroups to obtain the image difference.

19. The apparatus according to claim 16, wherein the determiner is configured to:
determine a first target value, wherein the first target value is a sum of differences between corresponding transform coefficients in the first group of transform coefficients and in the second group of transform coefficients;
determine a second target value, wherein the second target value is a sum of differences between corresponding transform coefficients in a first remaining group of transform coefficients other than the first group of transform coefficients in the first transform coefficient set and in a second remaining group of transform coefficients other than the second group of transform coefficients in the second transform coefficient set; and
perform weighted summation on the first target value and the second target value according to a weighting coefficient of the first target value and a weighting coefficient of the second target value to obtain the image difference.

20. The apparatus according to claim 15, wherein the determiner is further configured to:
select, from the second transform coefficient set according to a one-to-one correspondence between transform coefficients in the first transform coefficient set and in the second transform coefficient set, a second group of transform coefficients that is corresponding to the first group of transform coefficients; and
determine the image difference according to the second group of transform coefficients.

21. The apparatus according to claim 20, wherein the determiner is configured to determine a sum of transform coefficients in the second group of transform coefficients as the image difference.

22. The apparatus according to claim 20, wherein the second group of transform coefficients comprises N subgroups, wherein N is an integer, and wherein the determiner is further configured to:
  determine N target values, wherein an $i^{th}$ target value is a sum of transform coefficients in an $i^{th}$ subgroup; and
  perform weighted summation on the N target values according to weighting coefficients of the N target values, to obtain the image difference.

23. The apparatus according to claim 20, wherein the determiner is further configured to:
  determine a first target value, wherein the first target value is a sum of transform coefficients in the second group of transform coefficients;
  determine a second target value, wherein the second target value is a sum of the second group of remaining transform coefficients other than the second group of transform coefficients in the second transform coefficient set; and
  perform weighted summation on the first target value and the second target value according to a weighting coefficient of the first target value and a weighting coefficient of the second target value to obtain the image difference.

24. The apparatus according to claim 15, wherein the first image is a target image and the second image is any candidate image in K candidate images, wherein K is an integer, and wherein the processor is further configured to:
  determine a weighting coefficient of each candidate image according to an image difference between the target image and each candidate image; and
  determine a filtered image of the target image according to pixel values of the K candidate images and weighting coefficients of the K candidate images.

25. The apparatus according to claim 24, wherein the determiner is configured to determine the weighting coefficient of each candidate image according to $Wk=b1^{(-(Dk)^{a1}/h1)}$, and wherein each of b1, a1, and h1 represents a positive real number, Dk represents an image difference between the first image and a $k^{th}$ candidate image, and Wk represents a weighting coefficient of the $k^{th}$ candidate image.

26. The apparatus according to claim 24, wherein the determiner is configured to determine the weighting coefficient of each candidate image according to $Wk=b2-(Dk)^{a2}/h2$, and wherein each of b2, a2, and h2 represents a positive real number, Dk represents an image difference between the first image and a $k^{th}$ candidate image, and Wk represents a weighting coefficient of the $k^{th}$ candidate image.

27. The apparatus according to claim 24, wherein the determiner is configured to determine the weighting coefficient of each candidate image according to $$Wk = \frac{h3}{b3 + (Dk)^{a3}},$$

and wherein each of b3, a3, and h3 represents a positive real number, Dk represents an image difference between the first image and a $k^{th}$ candidate image, and Wk represents a weighting coefficient of the $k^{th}$ candidate image.

28. The apparatus according to claim 24, wherein the processor is configured to determine the filtered image according to $$Pf_j = \frac{W0 \times P0_j + \sum_{k=1}^{K} Wk \times Pk_j}{W0 + \sum_{k=1}^{K} Wk},$$

and wherein $Pf_j$ represents a pixel value of the filtered image at a $j^{th}$ pixel point, W0 represents a weighting coefficient of the first image, Wk represents a weighting coefficient of a $k^{th}$ candidate image, $P0_j$ represents a pixel value of the first image at a $j^{th}$ pixel point, and $Pk_j$ represents a pixel value of the $k^{th}$ candidate image at a $j^{th}$ pixel point.

* * * * *